(12) United States Patent
Jones et al.

(10) Patent No.: US 11,803,299 B2
(45) Date of Patent: *Oct. 31, 2023

(54) SPECIAL LOCK MODE USER INTERFACE

(71) Applicant: Apple Inc., Cupertino, CA (US)

(72) Inventors: Bronwyn Jones, San Francisco, CA (US); Gary Ian Butcher, Los Gatos, CA (US); Stephen O. Lemay, Palo Alto, CA (US); Nathan De Vries, Alameda, CA (US); Molly Pray Wiebe, San Francisco, CA (US); Aled Hywel Williams, Llandeilo (GB)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,030

(22) Filed: Jan. 26, 2023

(65) Prior Publication Data
US 2023/0168801 A1     Jun. 1, 2023

Related U.S. Application Data

(63) Continuation of application No. 17/699,983, filed on Mar. 21, 2022, now Pat. No. 11,567,657, which is a
(Continued)

(51) Int. Cl.
*G06F 3/0488* (2022.01)
*G06F 3/04883* (2022.01)
(Continued)

(52) U.S. Cl.
CPC .......... *G06F 3/04883* (2013.01); *G06F 1/163* (2013.01); *G06F 1/169* (2013.01);
(Continued)

(58) Field of Classification Search
CPC ................................................... G06F 3/04883
See application file for complete search history.

(56) References Cited

U.S. PATENT DOCUMENTS 6,208,331 B1    3/2001  Singh et al.
7,593,000 B1 *  9/2009  Chin ................... G06F 3/04883
                                                    345/156
(Continued)

FOREIGN PATENT DOCUMENTS

CA     2876587 A1    2/2014
CN     1525723 A     9/2004
(Continued)

OTHER PUBLICATIONS

Advisory Action received for U.S. Appl. No. 13/077,614, dated Jun. 5, 2015, 3 pages.
(Continued)

*Primary Examiner* — Reza Nabi
(74) *Attorney, Agent, or Firm* — DLA Piper LLP (US)

(57) ABSTRACT

The present disclosure generally relates to user interfaces for managing input mechanisms. In some examples, the electronic device transitions from a first mode into a second mode in accordance with a determination that the one or more characteristics of a user input detected via a second input mechanism of the electronic device meet a set of predefined criteria. In the first mode, a first input mechanism of the electronic device is disabled for user input. In the second mode, the first input mechanism of the electronic device is enabled for user input.

51 Claims, 46 Drawing Sheets

Related U.S. Application Data continuation of application No. 17/084,484, filed on Oct. 29, 2020, now Pat. No. 11,281,372, which is a continuation of application No. 16/673,272, filed on Nov. 4, 2019, now Pat. No. 10,877,661, which is a continuation of application No. 15/627,729, filed on Jun. 20, 2017, now Pat. No. 10,466,891.

(60) Provisional application No. 62/393,469, filed on Sep. 12, 2016.

(51) Int. Cl.

| | | |
|---|---|---|
| *G06F 3/0482* | (2013.01) | |
| *G06F 1/16* | (2006.01) | |
| *G06F 3/0362* | (2013.01) | |
| *G06F 3/0354* | (2013.01) | |
| *G06F 3/04817* | (2022.01) | |
| *G06F 3/041* | (2006.01) | |
| *H04M 1/23* | (2006.01) | |
| *H04M 1/18* | (2006.01) | |
| *H04M 1/72451* | (2021.01) | |
| *G06F 3/01* | (2006.01) | |
| *G06F 21/36* | (2013.01) | |
| *H04M 1/67* | (2006.01) | |

(52) U.S. Cl.
CPC ............ *G06F 1/1643* (2013.01); *G06F 3/016* (2013.01); *G06F 3/0362* (2013.01); *G06F 3/03547* (2013.01); *G06F 3/0416* (2013.01); *G06F 3/0482* (2013.01); *G06F 3/04817* (2013.01); *G06F 21/36* (2013.01); *H04M 1/18* (2013.01); *H04M 1/236* (2013.01); *H04M 1/67* (2013.01); *H04M 1/72451* (2021.01); *G06F 2203/04105* (2013.01)

(56) References Cited

U.S. PATENT DOCUMENTS

| | | | | |
|---|---|---|---|---|
| 8,077,157 | B2* | 12/2011 | Sengupta | H04W 4/21 345/173 |
| 8,171,137 | B1* | 5/2012 | Parks | G06F 9/4856 709/224 |
| 8,224,894 | B1* | 7/2012 | Parks | H04L 65/1083 709/203 |
| 8,260,879 | B2 | 9/2012 | Chan | |
| 8,341,557 | B2 | 12/2012 | Pisula et al. | |
| 8,464,083 | B1* | 6/2013 | Nanda | G06F 21/31 713/182 |
| 8,478,816 | B2 | 7/2013 | Parks et al. | |
| 8,539,550 | B1* | 9/2013 | Terres | G06F 21/31 726/16 |
| 8,613,070 | B1* | 12/2013 | Borzycki | G06F 21/6218 726/8 |
| 8,628,413 | B2 | 1/2014 | Lemay et al. | |
| 8,718,556 | B2* | 5/2014 | Lee | H04M 1/7253 455/41.1 |
| 9,021,270 | B1* | 4/2015 | Byers | H04L 63/0861 713/186 |
| 9,095,779 | B2* | 8/2015 | Chan | A63F 13/12 |
| 2002/0196274 | A1* | 12/2002 | Comfort | G06F 3/04886 715/741 |
| 2003/0055977 | A1* | 3/2003 | Miller | H04L 29/06 709/227 |
| 2005/0162407 | A1 | 7/2005 | Sakurai et al. | |
| 2005/0251451 | A1* | 11/2005 | Tan | G06F 3/04886 705/18 |
| 2006/0005131 | A1* | 1/2006 | Tao | G06F 1/1624 715/702 |
| 2006/0007129 | A1 | 1/2006 | Pletikosa et al. | |
| 2006/0185005 | A1* | 8/2006 | Graves | G06F 19/3418 726/9 |
| 2006/0209040 | A1* | 9/2006 | Garside | G06F 3/03545 345/173 |
| 2007/0047747 | A1 | 3/2007 | Yoshida et al. | |
| 2007/0115933 | A1* | 5/2007 | Muhamed | H04L 29/06027 370/352 |
| 2007/0222769 | A1* | 9/2007 | Otsuka | G01C 21/265 345/173 |
| 2007/0281666 | A1* | 12/2007 | Yoshida | H04M 1/021 455/411 |
| 2008/0001703 | A1* | 1/2008 | Goto | H04M 1/0243 340/5.8 |
| 2008/0052528 | A1* | 2/2008 | Poo | G06F 21/32 713/186 |
| 2008/0158189 | A1* | 7/2008 | Kim | G06F 3/04886 345/173 |
| 2008/0160974 | A1* | 7/2008 | Vartiainen | G06F 9/4856 455/414.3 |
| 2008/0282202 | A1* | 11/2008 | Sunday | G06F 3/0483 715/863 |
| 2008/0313257 | A1* | 12/2008 | Allen | G06F 9/44505 709/201 |
| 2009/0064055 | A1* | 3/2009 | Chaudhri | G06F 3/04817 715/863 |
| 2009/0100383 | A1* | 4/2009 | Sunday | G06F 3/04883 715/863 |
| 2009/0133117 | A1* | 5/2009 | Bentley | H04L 9/3271 726/17 |
| 2009/0140960 | A1* | 6/2009 | Mahowald | G06F 11/325 345/83 |
| 2009/0177981 | A1* | 7/2009 | Christie | G06F 3/04883 715/758 |
| 2009/0249235 | A1* | 10/2009 | Kim | G06F 3/0481 715/765 |
| 2009/0271702 | A1* | 10/2009 | Bamford | G06F 3/0483 715/702 |
| 2009/0289916 | A1* | 11/2009 | Dai | G06F 3/04883 345/173 |
| 2009/0303187 | A1* | 12/2009 | Pallakoff | G06F 3/0488 345/169 |
| 2009/0303231 | A1* | 12/2009 | Robinet | G06F 3/04815 345/419 |
| 2009/0307768 | A1* | 12/2009 | Zhang | G06F 3/04883 726/19 |
| 2010/0031200 | A1* | 2/2010 | Chen | G06F 3/04883 715/863 |
| 2010/0159995 | A1* | 6/2010 | Stallings | G06F 3/0488 455/566 |
| 2010/0182248 | A1* | 7/2010 | Chun | G06F 3/041 345/173 |
| 2010/0225607 | A1* | 9/2010 | Kim | G06F 3/042 345/173 |
| 2010/0235794 | A1* | 9/2010 | Ording | G06F 3/0485 715/863 |
| 2010/0306718 | A1* | 12/2010 | Shim | G06F 3/04883 715/863 |
| 2011/0016417 | A1* | 1/2011 | Shiplacoff | G06F 3/0483 715/768 |
| 2011/0029891 | A1* | 2/2011 | Kim | H04M 1/72561 715/752 |
| 2011/0035598 | A1* | 2/2011 | Pizano | G06F 21/6245 713/186 |
| 2011/0041102 | A1* | 2/2011 | Kim | G06F 3/04883 715/863 |
| 2011/0065384 | A1* | 3/2011 | Cader | H04M 3/58 455/41.1 |
| 2011/0076981 | A1* | 3/2011 | Singh | H04M 1/673 455/404.1 |
| 2011/0088086 | A1* | 4/2011 | Swink | G06F 3/04883 726/7 |
| 2011/0107416 | A1 | 5/2011 | Poo et al. | |
| 2011/0179386 | A1* | 7/2011 | Shaffer | G06F 3/04883 715/835 |
| 2011/0234428 | A1* | 9/2011 | Taniyama | G06F 3/0233 341/22 |
| 2011/0260829 | A1* | 10/2011 | Lee | G06F 3/0414 340/5.51 |

(56) References Cited

U.S. PATENT DOCUMENTS

| | | | |
|---|---|---|---|
| 2011/0275358 A1* | 11/2011 | Faenger | G06F 9/4856 455/420 |
| 2011/0281568 A1* | 11/2011 | Le Clech | H04M 1/575 455/415 |
| 2011/0314398 A1* | 12/2011 | Yano | G06F 9/451 715/764 |
| 2012/0036556 A1* | 2/2012 | LeBeau | G06F 3/048 726/3 |
| 2012/0071149 A1* | 3/2012 | Bandyopadhyay | G06F 1/1643 455/418 |
| 2012/0075098 A1* | 3/2012 | Kuncl | H04M 1/67 340/539.32 |
| 2012/0084734 A1* | 4/2012 | Wilairat | G06F 21/36 715/863 |
| 2012/0096069 A1 | 4/2012 | Chan | |
| 2012/0096076 A1* | 4/2012 | Chan | G06F 9/4856 709/203 |
| 2012/0096386 A1* | 4/2012 | Baumann | G06Q 30/0601 715/772 |
| 2012/0129496 A1* | 5/2012 | Park | G06F 3/0488 455/411 |
| 2012/0143694 A1* | 6/2012 | Zargahi | G06Q 30/0603 705/14.66 |
| 2012/0166944 A1 | 6/2012 | Cotterill | |
| 2012/0166998 A1* | 6/2012 | Cotterill | G06F 3/0483 715/780 |
| 2012/0223890 A1* | 9/2012 | Borovsky | G06F 3/04883 345/173 |
| 2012/0284673 A1* | 11/2012 | Lamb | G06F 3/04883 715/863 |
| 2012/0290657 A1 | 11/2012 | Parks et al. | |
| 2012/0290943 A1* | 11/2012 | Toney | G06F 3/0481 715/751 |
| 2013/0005487 A1* | 1/2013 | Frazzini | H04L 67/38 463/43 |
| 2013/0041790 A1 | 2/2013 | Murugesan et al. | |
| 2013/0046893 A1* | 2/2013 | Hauser | G06F 9/4856 709/226 |
| 2013/0054697 A1* | 2/2013 | Cha | H04N 21/2347 709/204 |
| 2013/0080525 A1* | 3/2013 | Aoki | G06F 9/4856 709/204 |
| 2013/0120254 A1* | 5/2013 | Mun | G06F 3/017 345/158 |
| 2013/0145303 A1* | 6/2013 | Prakash | G06F 3/04883 715/779 |
| 2013/0173699 A1 | 7/2013 | Parks et al. | |
| 2013/0191911 A1* | 7/2013 | Dellinger | G06F 3/0488 726/19 |
| 2013/0212212 A1* | 8/2013 | Addepalli | G06F 9/461 709/217 |
| 2013/0283199 A1* | 10/2013 | Selig | G06F 3/0484 715/781 |
| 2013/0298024 A1* | 11/2013 | Rhee | G06F 21/31 715/716 |
| 2013/0318158 A1* | 11/2013 | Teng | H04L 67/42 709/203 |
| 2013/0318249 A1* | 11/2013 | McDonough | H04L 67/02 709/228 |
| 2013/0325967 A1 | 12/2013 | Parks et al. | |
| 2014/0032706 A1* | 1/2014 | Kuscher | H04L 67/1095 709/217 |
| 2014/0047020 A1* | 2/2014 | Matus | H04L 67/306 709/204 |
| 2014/0047382 A1* | 2/2014 | Kim | G06F 3/0481 715/800 |
| 2014/0082136 A1* | 3/2014 | Garcia Puga | H04L 29/08981 709/217 |
| 2014/0136481 A1* | 5/2014 | Quan | H04W 4/023 707/617 |
| 2014/0149884 A1* | 5/2014 | Flynn, III | G06Q 10/10 715/752 |
| 2014/0165012 A1* | 6/2014 | Shen | G06F 3/0488 715/863 |
| 2014/0173447 A1* | 6/2014 | Das | G06F 3/04842 715/738 |
| 2014/0208272 A1 | 7/2014 | Vats et al. | |
| 2014/0282240 A1* | 9/2014 | Flynn, III | G06F 3/0488 715/810 |
| 2014/0325447 A1* | 10/2014 | Jin | G06F 3/04817 715/835 |
| 2014/0359637 A1* | 12/2014 | Yan | G06F 9/4881 718/108 |
| 2014/0375577 A1* | 12/2014 | Yeh | G06F 3/0416 345/173 |
| 2014/0380187 A1* | 12/2014 | Gardenfors | G06F 3/017 715/748 |
| 2015/0163188 A1* | 6/2015 | Faaborg | H04L 51/04 715/753 |
| 2015/0193069 A1* | 7/2015 | Di Censo | G06F 3/017 345/173 |
| 2015/0319534 A1 | 11/2015 | Lippert et al. | |
| 2015/0339466 A1* | 11/2015 | Gao | G06F 21/36 726/16 |
| 2015/0347010 A1 | 12/2015 | Yang et al. | |
| 2015/0350296 A1 | 12/2015 | Yang et al. | |
| 2015/0350297 A1* | 12/2015 | Yang | H04L 67/025 715/740 |
| 2016/0035209 A1 | 2/2016 | Martin et al. | |
| 2016/0241945 A1* | 8/2016 | Zadesky | H04R 1/086 |
| 2016/0364025 A1 | 12/2016 | Bernstein et al. | |
| 2017/0053542 A1 | 2/2017 | Wilson et al. | |
| 2017/0277361 A1 | 9/2017 | Schulze et al. | |
| 2017/0354845 A1 | 12/2017 | Williams et al. | |
| 2017/0357411 A1 | 12/2017 | Williams et al. | |
| 2018/0074693 A1 | 3/2018 | Jones et al. | |
| 2018/0329584 A1 | 11/2018 | Williams et al. | |
| 2019/0182371 A1 | 6/2019 | Ashall et al. | |
| 2020/0210060 A1 | 7/2020 | Jones et al. | |
| 2020/0225819 A1 | 7/2020 | Cotterill et al. | |
| 2021/0048943 A1 | 2/2021 | Jones et al. | |
| 2022/0350479 A1 | 11/2022 | Jones et al. | |

FOREIGN PATENT DOCUMENTS

| | | |
|---|---|---|
| CN | 101409743 A | 4/2009 |
| CN | 102262506 A | 11/2011 |
| CN | 102508591 A | 6/2012 |
| CN | 102707994 A | 10/2012 |
| CN | 102750086 A | 10/2012 |
| CN | 102929424 A | 2/2013 |
| CN | 103250138 A | 8/2013 |
| CN | 103582873 A | 2/2014 |
| CN | 105659522 A | 6/2016 |
| EP | 1215575 A2 | 6/2002 |
| EP | 1580652 A2 | 9/2005 |
| EP | 1953663 A1 | 8/2008 |
| EP | 2075680 A2 | 7/2009 |
| EP | 2128750 A2 | 12/2009 |
| EP | 2725473 A1 | 4/2014 |
| EP | 2770708 A1 | 8/2014 |
| JP | 2000-200092 A | 7/2000 |
| JP | 2009-296577 A | 12/2009 |
| JP | 2010-245940 A | 10/2010 |
| JP | 2012-168966 A | 9/2012 |
| JP | 2014-503861 A | 2/2014 |
| JP | 2015-520456 A | 7/2015 |
| KR | 10-2013-0063019 A | 6/2013 |
| KR | 10-2013-0075783 A | 7/2013 |
| KR | 10-2013-0082190 A | 7/2013 |
| TW | 201415345 A | 4/2014 |
| TW | 201416959 A | 5/2014 |
| WO | 2005/109829 A1 | 11/2005 |
| WO | 2007/102110 A2 | 9/2007 |
| WO | 2012/028773 A1 | 3/2012 |
| WO | 2012/051052 A1 | 4/2012 |
| WO | 2012/126078 A1 | 9/2012 |

(56) References Cited

FOREIGN PATENT DOCUMENTS

| WO | 2013/132144 A1 | 9/2013 |
| WO | 2013/173838 A2 | 11/2013 |
| WO | 2014/197279 A1 | 12/2014 |

OTHER PUBLICATIONS

Advisory Action received for U.S. Appl. No. 13/077,670, dated Aug. 25, 2015, 4 pages.
Chan Christine, "Handoff Your Browser to Your iPhone or iPad! Plus a Chance to Win a Copy!", Apr. 12, 2011, 2 pages.
Corrected Notice of Allowance received for U.S. Appl. No. 16/673,272, dated Sep. 23, 2020, 5 pages.
Corrected Notice of Allowance received for U.S. Appl. No. 17/084,484, dated Oct. 4, 2021, 2 pages.
Corrected Notice of Allowance received for U.S. Appl. No. 17/084,484, dated Oct. 29, 2021, 2 pages.
Decision on Appeal received for U.S. Appl. No. 13/077,614, dated Dec. 2, 2019, 9 pages.
Decision on Appeal received for U.S. Appl. No. 13/077,670, dated Feb. 4, 2020, 11 pages.
Decision to Grant received for European Patent Application No. 17849345.8, dated Aug. 26, 2021, 2 pages.
Evaluation Report for Utility Model Patent received for Chinese Patent Application No. 201620051290.7, completed on Sep. 19, 2016, 11 pages.
Extended European Search Report received for European Patent Application No. 17849345.8, dated Mar. 19, 2020, 7 pages.
Extended European Search Report received for European Patent Application No. 21193618.2, dated Sep. 24, 2021, 7 pages.
Final Office Action received for U.S. Appl. No. 13/077,614, dated Feb. 20, 2015, 14 pages.
Final Office Action received for U.S. Appl. No. 13/077,614, dated Mar. 24, 2016, 18 pages.
Final Office Action received for U.S. Appl. No. 13/077,670, dated Apr. 17, 2015, 12 pages.
Final Office Action received for U.S. Appl. No. 13/077,670, dated Dec. 9, 2014, 13 pages.
Final Office Action received for U.S. Appl. No. 14/641,289, dated Jul. 1, 2016, 32 pages.
Final Office Action received for U.S. Appl. No. 13/077,614, dated Oct. 27, 2016, 19 pages.
G Pad, LG's latest UIs that shine even more on the G-Pad, online available at http://bungq.com/1014., Nov. 19, 2013, 49 pages.
Intention to Grant received for European Patent Application No. 17849345.8, dated Apr. 16, 2021, 8 pages.
International Preliminary Report on Patentability received for PCT Patent Application No. PCT/US2011/066997, dated Jul. 4, 2013, 14 pages.
International Preliminary Report on Patentability Received for PCT Patent Application No. PCT/US2015/019306, dated Dec. 15, 2016, 10 pages.
International Preliminary Report on Patentability Received for PCT Patent Application No. PCT/US2015/019309, dated Dec. 15, 2016, 10 pages.
International Preliminary Report on Patentability received for PCT Patent Application No. PCT/US2017/049419, dated Mar. 21, 2019, 14 pages.
International Search Report and Written Opinion received for PCT Application No. PCT/US2015/019309, dated Jun. 25, 2015, 15 pages.
International Search Report and Written Opinion received for PCT Patent Application No. PCT/US2011/066997, dated Jun. 19, 2012, 18 pages.
International Search Report and Written Opinion received for PCT Patent Application No. PCT/US2015/019306, dated Jun. 17, 2015, 15 pages.
International Search Report and Written Opinion received for PCT Patent Application No. PCT/US2017/049419, dated Nov. 8, 2017, 16 pages.
Invitation to Pay Addition Fees and Partial International Search Report received for PCT Patent Application No. PCT/US2011/066997, dated Mar. 27, 2012, 7 pages.
Kimura Ryoji, "Keynote presentation practice guide for iPad & iPhone", K.K. Rutles, first edition, Feb. 29, 2012, 4 pages.
Non-Final Office Action received for U.S. Appl. No. 14/641,289, dated Jul. 16, 2015, 31 pages.
Non-Final Office Action received for U.S. Appl. No. 14/641,289, dated Mar. 11, 2016, 26 pages.
Non-Final Office Action received for U.S. Appl. No. 13/077,614, dated Apr. 3, 2014, 11 pages.
Non-Final Office Action received for U.S. Appl. No. 13/077,614, dated Aug. 11, 2015, 15 pages.
Non-Final Office Action received for U.S. Appl. No. 13/077,670, dated Apr. 3, 2014, 10 pages.
Non-Final Office Action received for U.S. Appl. No. 13/077,670, dated Aug. 26, 2016, 13 pages.
Non-Final Office Action received for U.S. Appl. No. 14/641,298, dated Mar. 6, 2017, 26 pages.
Non-Final Office Action received for U.S. Appl. No. 14/641,304, dated Sep. 11, 2017, 18 pages.
Non-Final Office Action received for U.S. Appl. No. 15/627,729, dated Jan. 11, 2019, 41 pages.
Non-Final Office Action received for U.S. Appl. No. 16/830,614, dated Feb. 19, 2021, 12 pages.
Notice of Acceptance received for Australian Patent Application No. 2015201884, dated Oct. 4, 2016, 3 pages.
Notice of Allowance received for Chinese Patent Application No. 201620051290.7, dated Jun. 22, 2016, 2 Pages.
Notice of Allowance received for Chinese Patent Application No. 201780055808.1, dated Nov. 12, 2020, 2 pages.
Notice of Allowance received for Chinese Patent Application No. 201520364847.8, dated Nov. 5, 2015, 9 pages.
Notice of Allowance received for Japanese Patent Application No. 2015-095183, dated Apr. 21, 2017, 3 pages.
Notice of Allowance Received for Taiwanese Patent Application No. 104117041, dated Feb. 24, 2017, 3 pages.
Notice of Allowance received for U.S. Appl. No. 13/077,614, dated Jan. 17, 2020, 8 pages.
Notice of Allowance received for U.S. Appl. No. 14/641,289, dated Aug. 24, 2017, 6 Pages.
Notice of Allowance received for U.S. Appl. No. 15/627,729, dated Jun. 25, 2019, 27 pages.
Notice of Allowance received for U.S. Appl. No. 16/673,272, dated Jun. 17, 2020, 18 pages.
Notice of Allowance received for U.S. Appl. No. 16/673,272, dated Sep. 15, 2020, 17 pages.
Notice of Allowance received for U.S. Appl. No. 17/084,484, dated Feb. 7, 2022, 17 pages.
Notice of Allowance received for U.S. Appl. No. 17/084,484, dated Sep. 8, 2021, 19 pages.
Notice of Allowance received for U.S. Appl. No. 17/699,983, dated Oct. 14, 2022, 27 pages.
Office Action received for Australian Patent Application No. 2015201884, dated Oct. 12, 2015, 4 pages.
Office Action received for Australian Patent Application No. 2015100490, dated Jun. 9, 2015, 6 pages.
Office Action received for Australian Patent Application No. 2015100490, dated Dec. 15, 2016, 2 pages.
Office Action received for Chinese Patent Application No. 201780055808.1, dated Aug. 5, 2020, 6 pages.
Office Action received for Chinese Patent Application No. 201780055808.1, dated Feb. 19, 2020, 19 pages.
Office Action received for Danish Patent Application No. PA201570256, dated Jul. 7, 2015, 2 pages.
Office Action received for Danish Patent Application No. PA201570256, dated Mar. 17, 2016, 5 pages.
Office Action received for Danish Patent Application No. PA201570256, dated May 23, 2017, 3 pages.

(56) References Cited

OTHER PUBLICATIONS

Office Action received for Danish Patent Application No. PA201570256, dated Oct. 10, 2016, 3 pages.
Office Action received for Hong Kong Patent Application No. 151051633, dated Jun. 5, 2015, 11 pages.
Office Action received for Japanese Patent Application No. 2015-095183, dated Jun. 3, 2016, 13 pages.
Office Action received for Korean Patent Application No. 10-2015-0072162, dated Apr. 20, 2016, 11 pages.
Office Action received for Korean Patent Application No. 10-2015-0072162, dated Feb. 27, 2017, 12 pages.
Office Action Received for Taiwanese Patent Application No. 104117041, dated Aug. 22, 2016, 6 pages.
Office Action received for Taiwanese Patent Application No. 104117042, dated Apr. 20, 2017, 18 pages.
QPair, online available at: http://mongri.net/entry/G-Pad-83-Qpair, Retrieved on Mar. 6, 2017, Dec. 20, 2013, 22 pages.
Search Report and Written Opinion received for Netherlands Patent Application No. 2008029, dated Apr. 1, 2014, 13 pages.
Search Report received for Netherlands Patent Application No. 2014737, dated Oct. 29, 2015, 9 pages.
Office Action received for European Patent Application No. 21193618.2, dated Jul. 24, 2023, 8 pages.

* cited by examiner 700 cont.

736
while continuing to detect the rotation of the second input mechanism, determining whether one or more characteristics of the rotation of the second input mechanism meet a second set of predefined criteria, wherein the set of predefined criteria is a first set of predefined criteria

738
In accordance with a determination that the one or more characteristics of the rotation meet the second set of predefined criteria, providing an output indicative of an ongoing transition from the first mode to the second mode

740
Displaying, on a display, an animation of an expanding water droplet

742
In accordance with a determination that the one or more characteristics of the rotation does not meet the second set of predefined criteria, foregoing providing the output indicative of an ongoing transition from the first mode to the second mode

744
In accordance with a determination that the one or more characteristics of the input detected via the second input mechanism do not meet the set of predefined criteria, remaining in the first mode and foregoing transitioning the electronic device into the second mode

746
Providing an output indicative of a failed transition from the first mode to the second mode

748
In accordance with a determination that the one or more characteristics of the input detected via the second input mechanism meet the set of predefined criteria, transitioning the electronic device into a second mode, wherein the first input mechanism is enabled for user input in the second mode

750
Providing an output indicative of a successful transition from the first mode to the second mode

752
The output indicative of a successful transition from the first mode to the second mode comprises an animation of one or more bursting water droplets

756
Emitting a sound via a speaker, wherein the emitted sound is configured to expel liquid from the speaker

758
At least a portion of the sound has a predefined frequency

760
The sound has a predefined duration

762
Providing an output indicative of successful transition from the first mode to the second mode while emitting the sound

720
While the electronic device is in the first mode

722
Detecting, via the first input mechanism, an input;

724
After detecting the input via the first input mechanism, foregoing providing an output indicating that the input has been detected

726
While the electronic device is in the first mode, foregoing detecting an input via the first input mechanism

730
While the electronic device is in the first mode, wherein a third input mechanism of the electronic device is disabled for user input in the first mode and enabled for user input in the second mode

732
Detecting, via the third input mechanism, an input;

734
In response to detecting the input via the third input mechanism, displaying, on the display, a message indicating that the electronic device is in the first mode

*FIG. 7E*

SPECIAL LOCK MODE USER INTERFACE

CROSS-REFERENCE TO RELATED APPLICATIONS

This application is a continuation of U.S. patent application Ser. No. 17/699,983, entitled "SPECIAL LOCK MODE USER INTERFACE," filed on Mar. 21, 2022, which is a continuation of U.S. patent application Ser. No. 17/084,484, entitled "SPECIAL LOCK MODE USER INTERFACE," filed on Oct. 29, 2020, which is a continuation of U.S. patent application Ser. No. 16/673,272, entitled "SPECIAL LOCK MODE USER INTERFACE," filed on Nov. 4, 2019, which is a continuation of U.S. patent application Ser. No. 15/627,729, entitled "SPECIAL LOCK MODE USER INTERFACE," filed on Jun. 20, 2017, which claims priority to U.S. provisional patent application 62/393,469, entitled "SPECIAL LOCK MODE USER INTERFACE", filed on Sep. 12, 2016. The contents of which are hereby incorporated by reference in their entirety.

FIELD

The present disclosure relates generally to computer user interfaces, and more specifically to techniques for managing input mechanisms.

BACKGROUND

With growing functionalities, electronic devices are increasingly being carried with users to assist with the users' everyday activities (e.g., tracking workout sessions). As such, the electronic devices are increasingly exposed to environmental factors (e.g., water) that can interact with the input mechanisms of the electronic devices.

BRIEF SUMMARY

Some environmental actions may result in undesirable effects. For example, when put in contact with water (e.g., when a user is swimming), a capacitive touch detection system of the electronic device can trigger false detection of inputs and cause the electronic device to perform tasks (e.g., making phone calls) that are not intended by the user.

Some techniques for managing input mechanisms to suppress detection and/or processing of false inputs at certain input mechanisms using electronic devices, however, are generally cumbersome, inefficient, and/or ineffective. For example, some existing techniques (e.g., powering off the electronic device and starting up the electronic device again, conventional locking and unlocking mechanisms) are not well adapted for scenarios in which input mechanisms need to be disabled and enabled in a fast yet secure manner. Further, existing techniques not only results in making important features inaccessible by the user, but also use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing input mechanisms. For example, the present technique provides a special lock mode in which various input mechanisms operate to minimize detection and/or processing of inadvertent inputs and furthermore allows for one or more predefined inputs (e.g., that are unlikely to be actuated by environmental factors such as water) for signaling the user's intent to transition out of the special lock mode. Such methods and interfaces optionally complement or replace other methods for managing input mechanisms. Such methods and interfaces reduce the cognitive burden on a user and produce a more efficient human-machine interface. For battery-operated computing devices, such methods and interfaces conserve power and increase the time between battery charges.

In accordance with some embodiments, a method is performed at an electronic device with a first input mechanism and a second input mechanism. The method comprises: while the electronic device is in a first mode, wherein the first input mechanism is disabled for user input in the first mode, detecting an input via the second input mechanism; determining whether one or more characteristics of the input detected via the second input mechanism meet a set of predefined criteria; in accordance with a determination that the one or more characteristics of the input detected via the second input mechanism meet the set of predefined criteria, transitioning the electronic device into a second mode, wherein the first input mechanism is enabled for user input in the second mode; in accordance with a determination that the one or more characteristics of the input detected via the second input mechanism do not meet the set of predefined criteria, remaining in the first mode and foregoing transitioning the electronic device into the second mode.

In accordance with some embodiments, an electronic device is described. The electronic device comprises: a first input mechanism; a second input mechanism; one or more processors; a memory storing one or more programs configured to be executed by the one or more processors, the one or more programs including instructions for: while the electronic device is in a first mode, wherein the first input mechanism is disabled for user input in the first mode, detecting an input via the second input mechanism; determining whether one or more characteristics of the input detected via the second input mechanism meet a set of predefined criteria; in accordance with a determination that the one or more characteristics of the input detected via the second input mechanism meet the set of predefined criteria, transitioning the electronic device into a second mode, wherein the first input mechanism is enabled for user input in the second mode; in accordance with a determination that the one or more characteristics of the input detected via the second input mechanism do not meet the set of predefined criteria, remaining in the first mode and foregoing transitioning the electronic device into the second mode.

In accordance with some embodiments, a non-transitory computer-readable storage medium is described. The non-transitory computer-readable storage medium stores one or more programs configured to be executed by one or more processors of an electronic device with a first input mechanism and a second input mechanism, the one or more programs including instructions for: while the electronic device is in a first mode, wherein the first input mechanism is disabled for user input in the first mode, detecting an input via the second input mechanism; determining whether one or more characteristics of the input detected via the second input mechanism meet a set of predefined criteria; in accordance with a determination that the one or more characteristics of the input detected via the second input mechanism meet the set of predefined criteria, transitioning the electronic device into a second mode, wherein the first input mechanism is enabled for user input in the second mode; in accordance with a determination that the one or more characteristics of the input detected via the second input mechanism do not meet the set of predefined criteria, remaining in the first mode and foregoing transitioning the electronic device into the second mode.

In accordance with some embodiments, an electronic device is described. The electronic device comprises: a first input mechanism; a second input mechanism; means for, while the electronic device is in a first mode, wherein the first input mechanism is disabled for user input in the first mode, detecting an input via the second input mechanism; means for determining whether one or more characteristics of the input detected via the second input mechanism meet a set of predefined criteria; means for, in accordance with a determination that the one or more characteristics of the input detected via the second input mechanism meet the set of predefined criteria, transitioning the electronic device into a second mode, wherein the first input mechanism is enabled for user input in the second mode; means for, in accordance with a determination that the one or more characteristics of the input detected via the second input mechanism do not meet the set of predefined criteria, remaining in the first mode and foregoing transitioning the electronic device into the second mode.

In accordance with some embodiments, a transitory computer-readable storage medium is described. The transitory computer-readable storage medium stores one or more programs configured to be executed by one or more processors of an electronic device with a first input mechanism and a second input mechanism, the one or more programs including instructions for: while the electronic device is in a first mode, wherein the first input mechanism is disabled for user input in the first mode, detecting an input via the second input mechanism; determining whether one or more characteristics of the input detected via the second input mechanism meet a set of predefined criteria; in accordance with a determination that the one or more characteristics of the input detected via the second input mechanism meet the set of predefined criteria, transitioning the electronic device into a second mode, wherein the first input mechanism is enabled for user input in the second mode; in accordance with a determination that the one or more characteristics of the input detected via the second input mechanism do not meet the set of predefined criteria, remaining in the first mode and foregoing transitioning the electronic device into the second mode.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing input mechanisms, thereby increasing the effectiveness, efficiency, and user satisfaction with such devices. Such methods and interfaces may complement or replace other methods for managing input mechanisms.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 7A-7E provide a flow diagram illustrating a method for managing input mechanisms, in accordance with some embodiments.

DESCRIPTION OF EMBODIMENTS

Figure 1A:
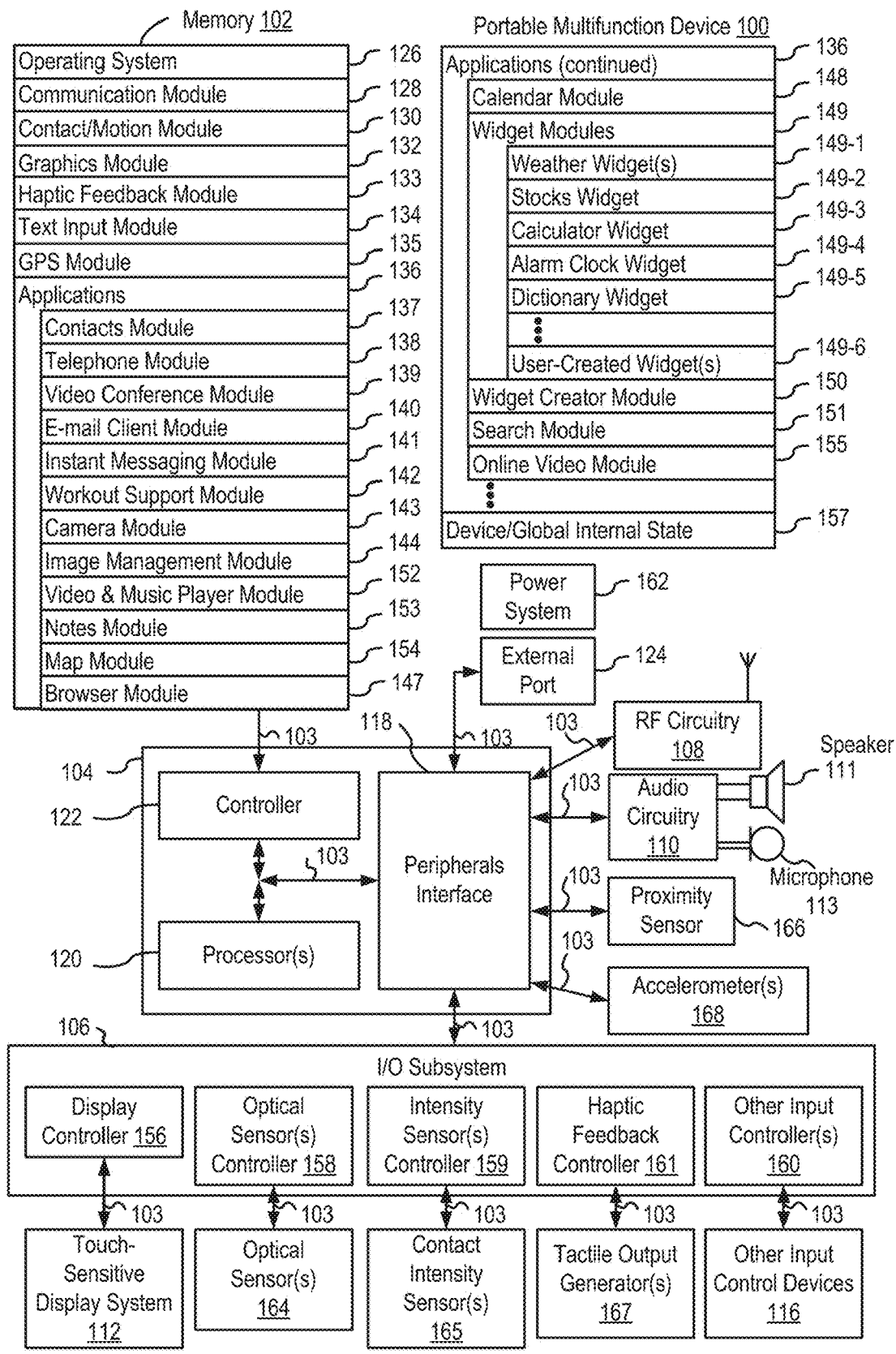
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing input mechanisms. It is advantageous to provide a special lock mode in which various input mechanisms operate to minimize detection and/or processing of inadvertent inputs and furthermore to allow for one or more predefined inputs (e.g., that are unlikely to be actuated by environmental factors such as water) for transitioning out of the special lock mode. Such techniques can reduce the cognitive burden on a user who desires to minimize detection and/or processing of inadvertent inputs at various input mechanisms, thereby enhancing productivity. Further, such techniques can reduce processor and battery power otherwise wasted on redundant user inputs.

Below, FIGS. 1A-1B, 2, 3, 4A-4B, and 5A-5H provide a description of exemplary devices for performing the techniques for managing input mechanisms of an electronic device. FIGS. 6A-6Z illustrate exemplary user interfaces for managing input mechanisms. FIG. 7A-7E include a flow diagram illustrating methods of managing event notifications in accordance with some embodiments. The user interfaces in FIGS. 6A-6Z are used to illustrate the processes described below, including the processes in FIGS. 7A-7E.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons is, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
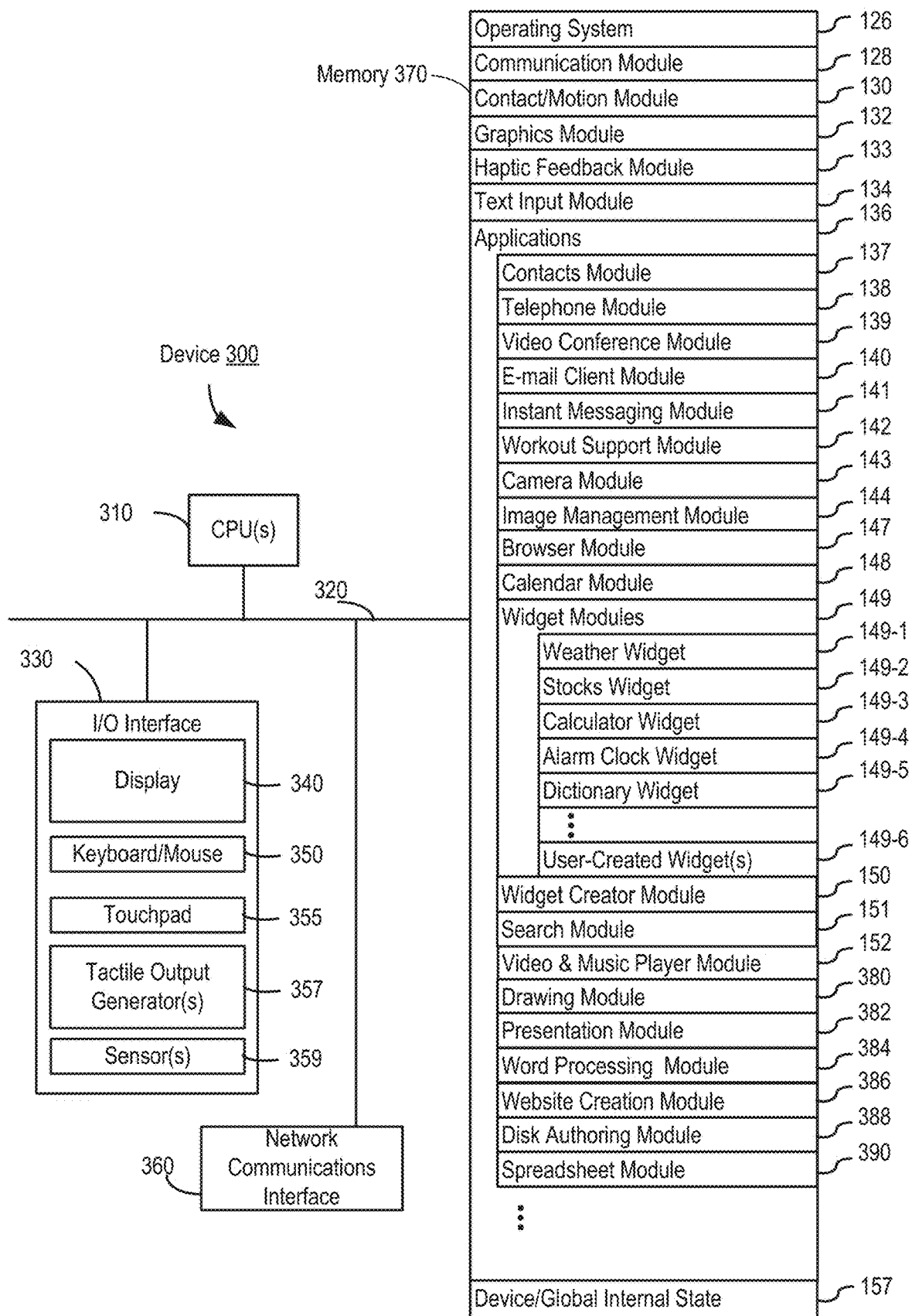
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
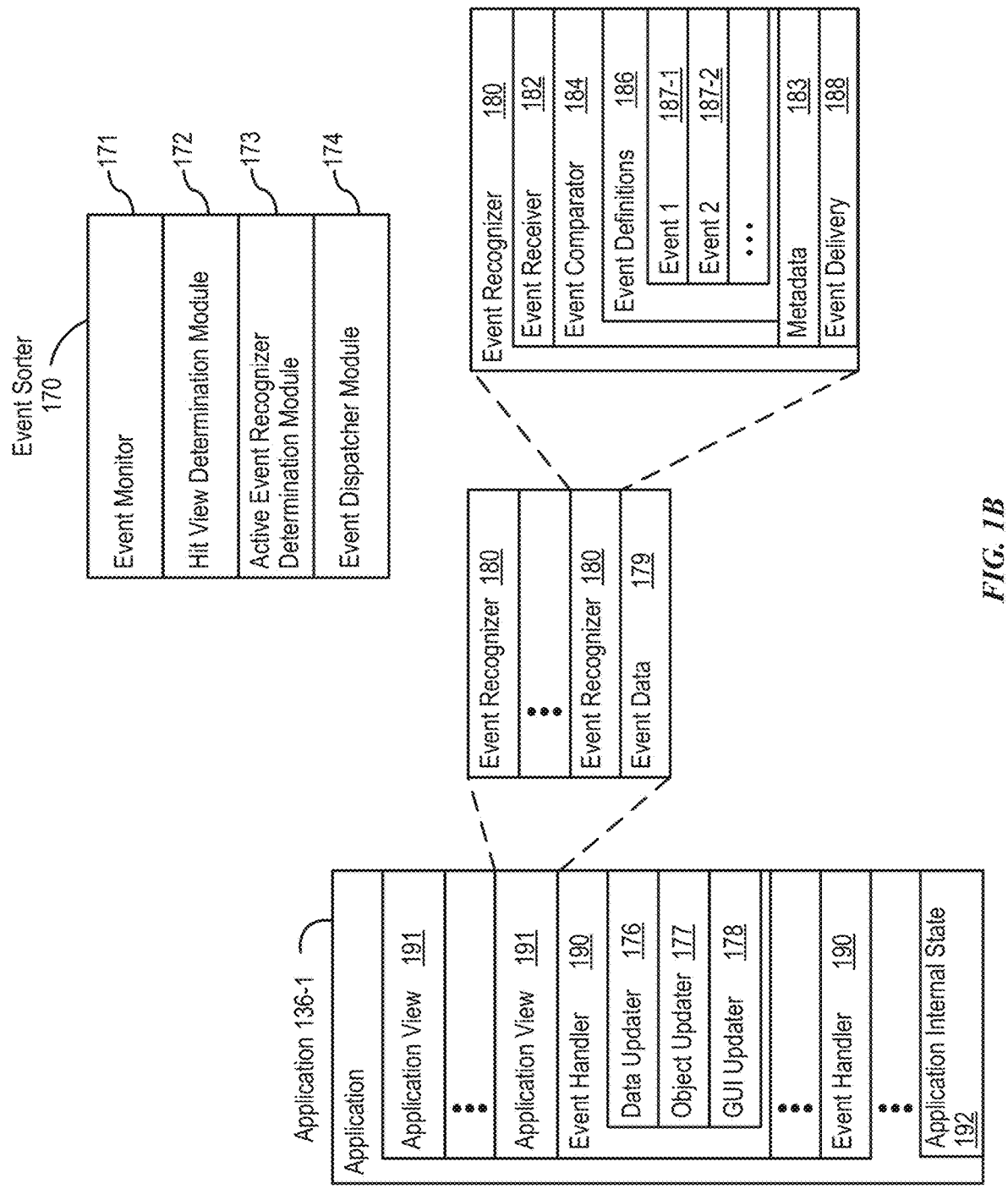
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
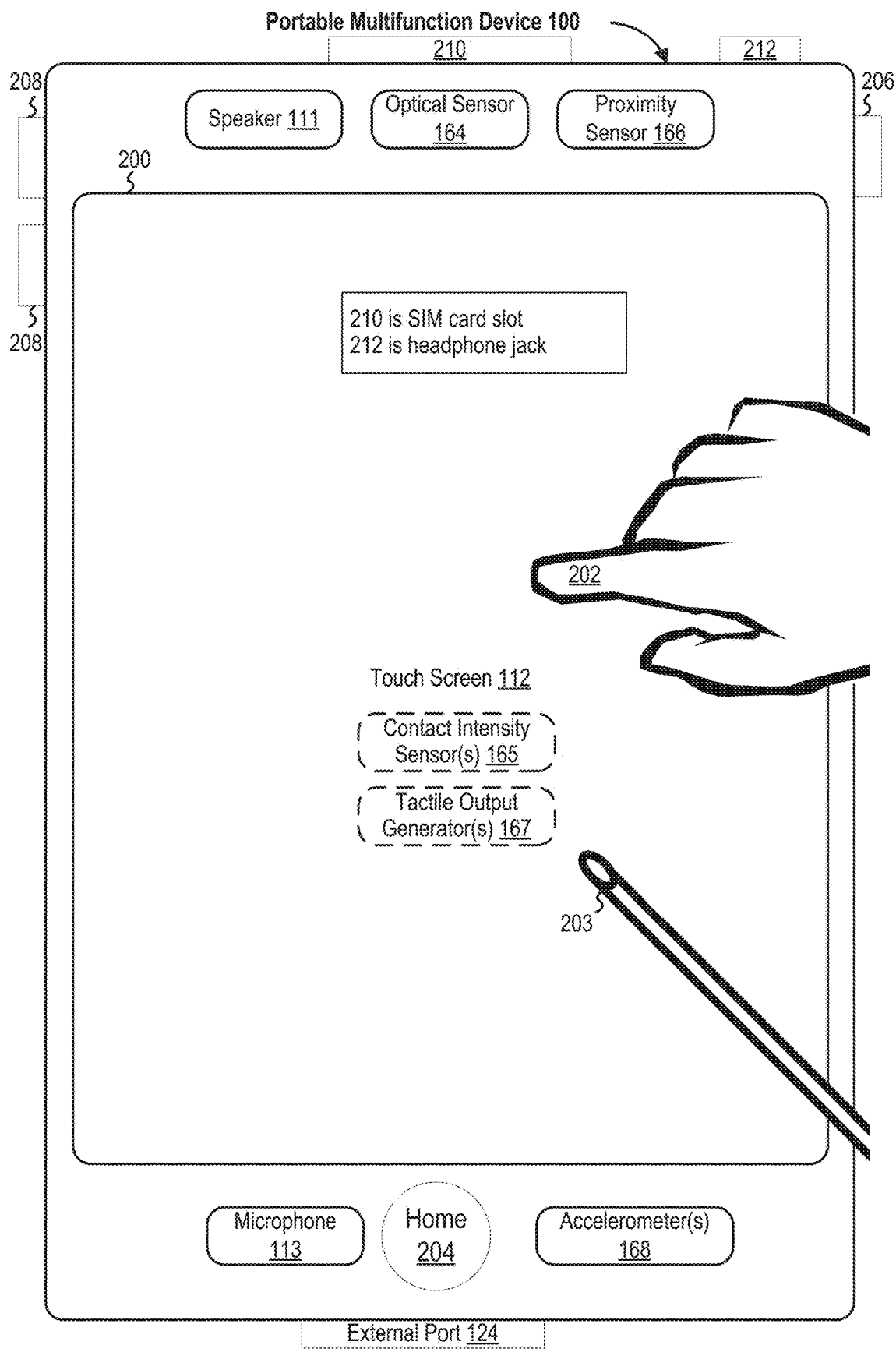
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
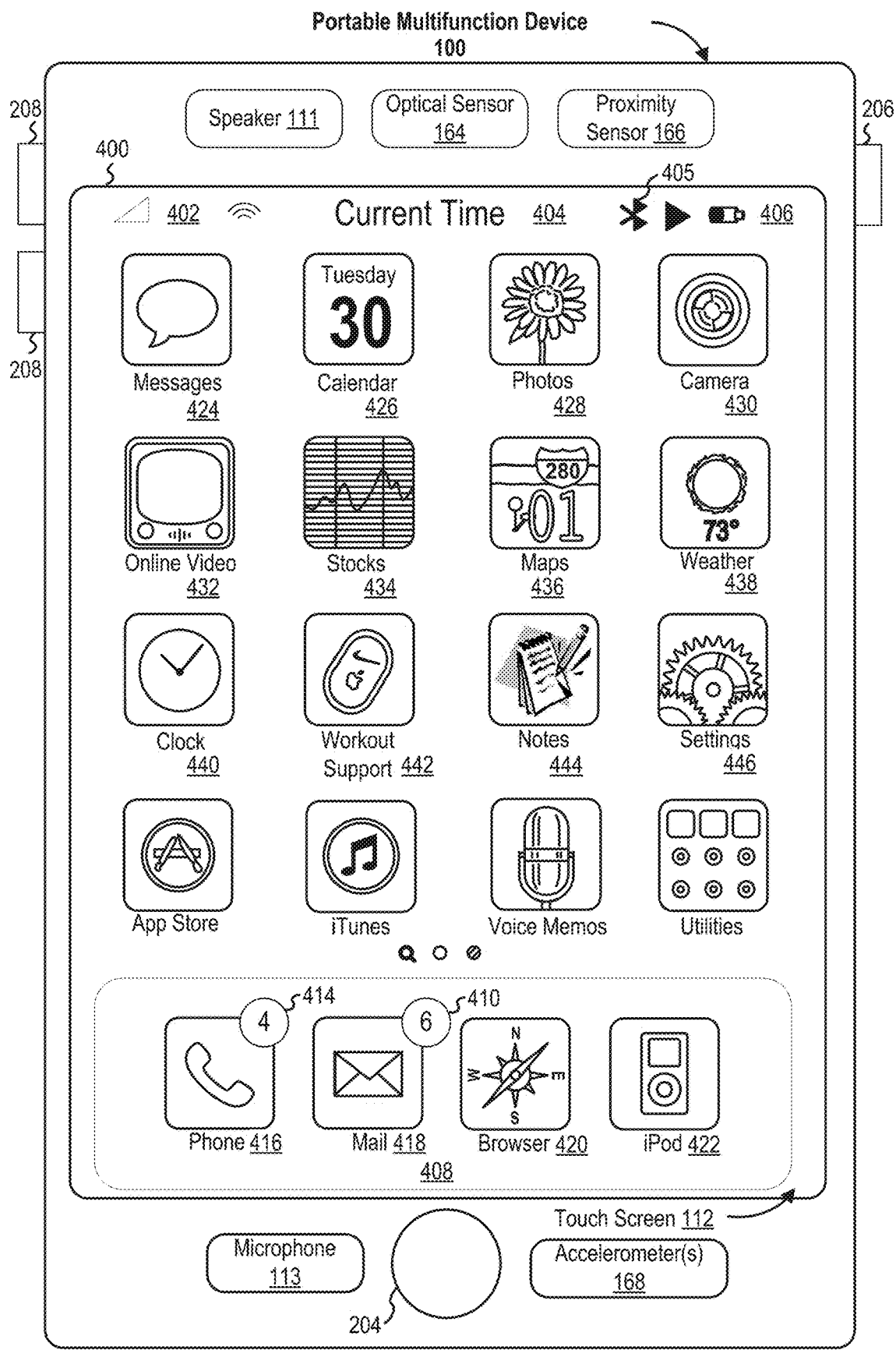
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
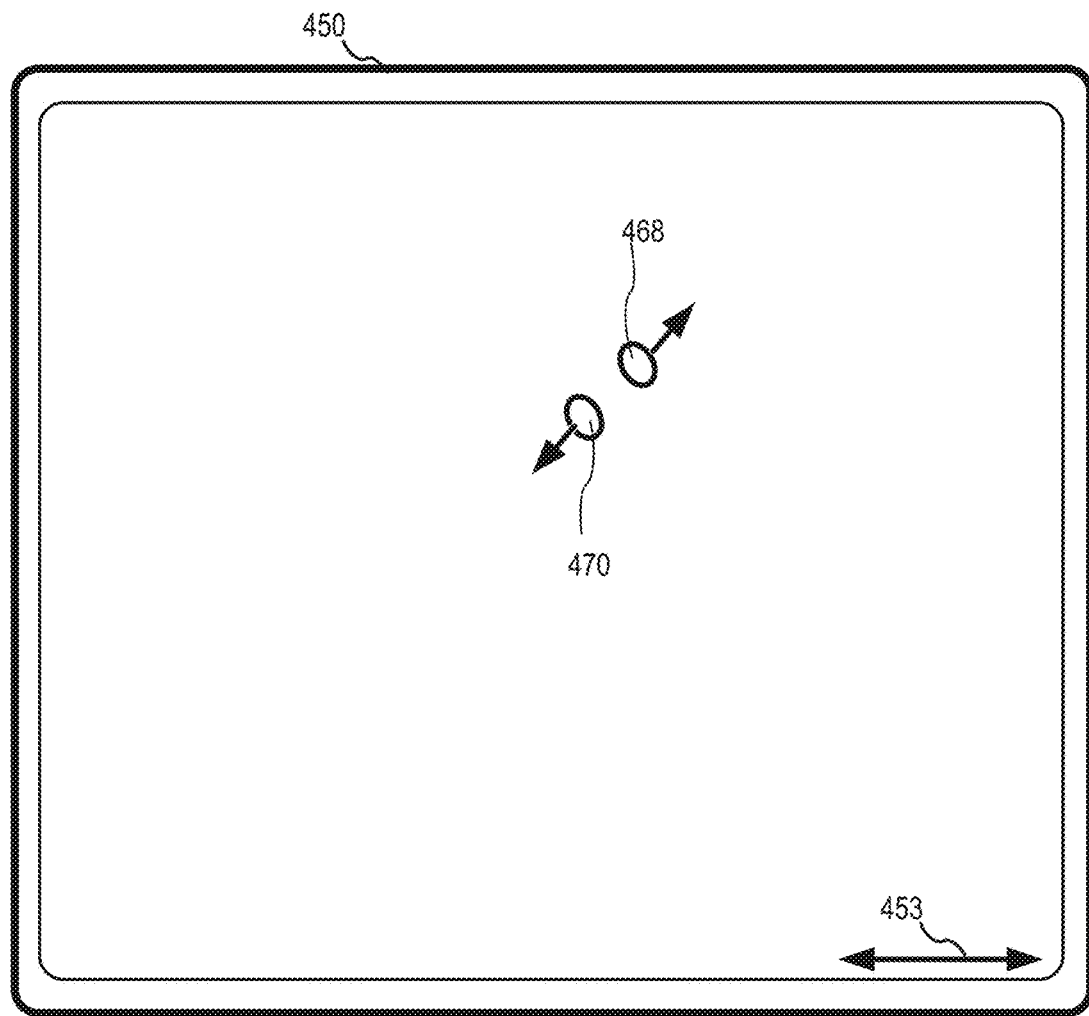
FIG. 4B illustrates an exemplary user interface for a multifunction device with a touch-sensitive surface that is separate from the display in accordance with some embodiments.
Figure 4B:
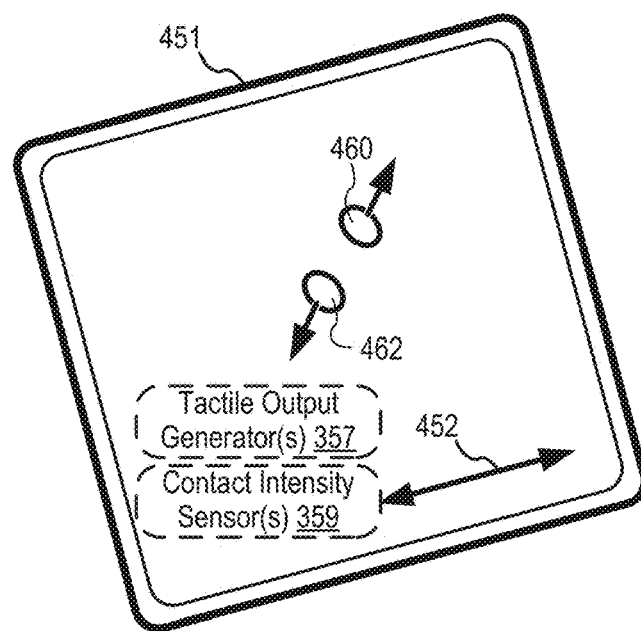

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
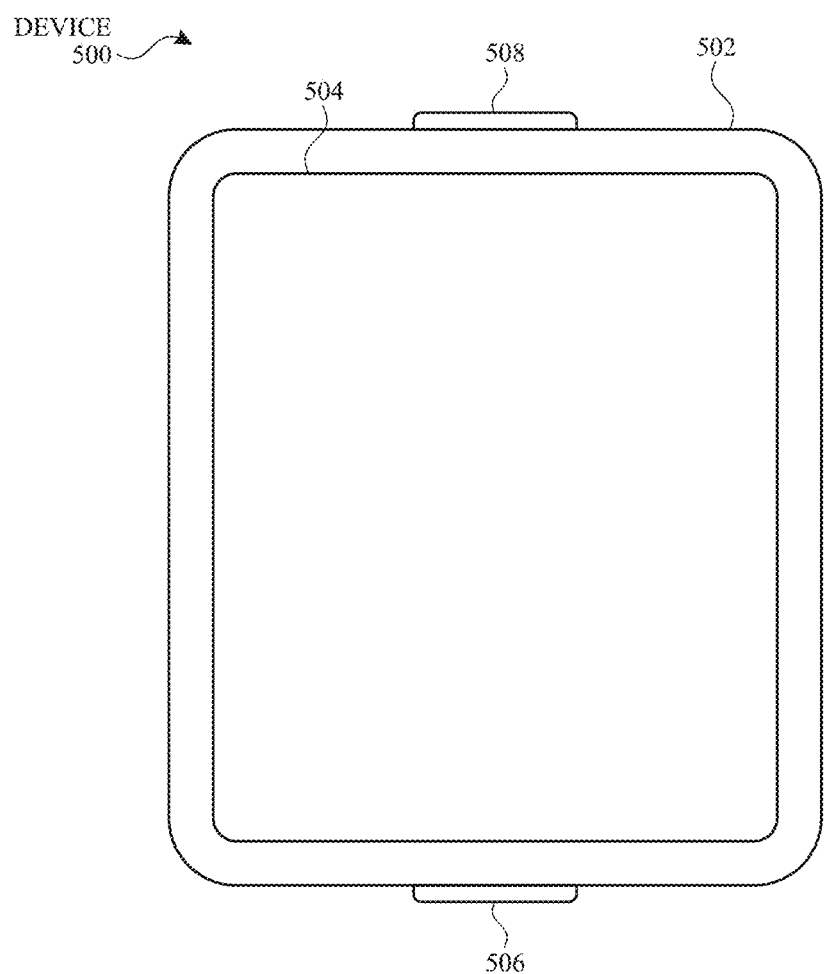
FIG. 5A illustrates a personal electronic device in accordance with some embodiments.
Figure 6A:
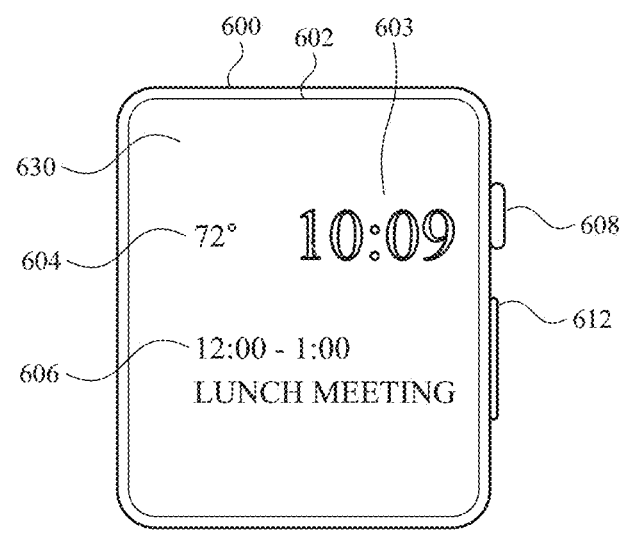
FIGS. 6A-6Z illustrate exemplary devices and user interfaces for managing input mechanisms, in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
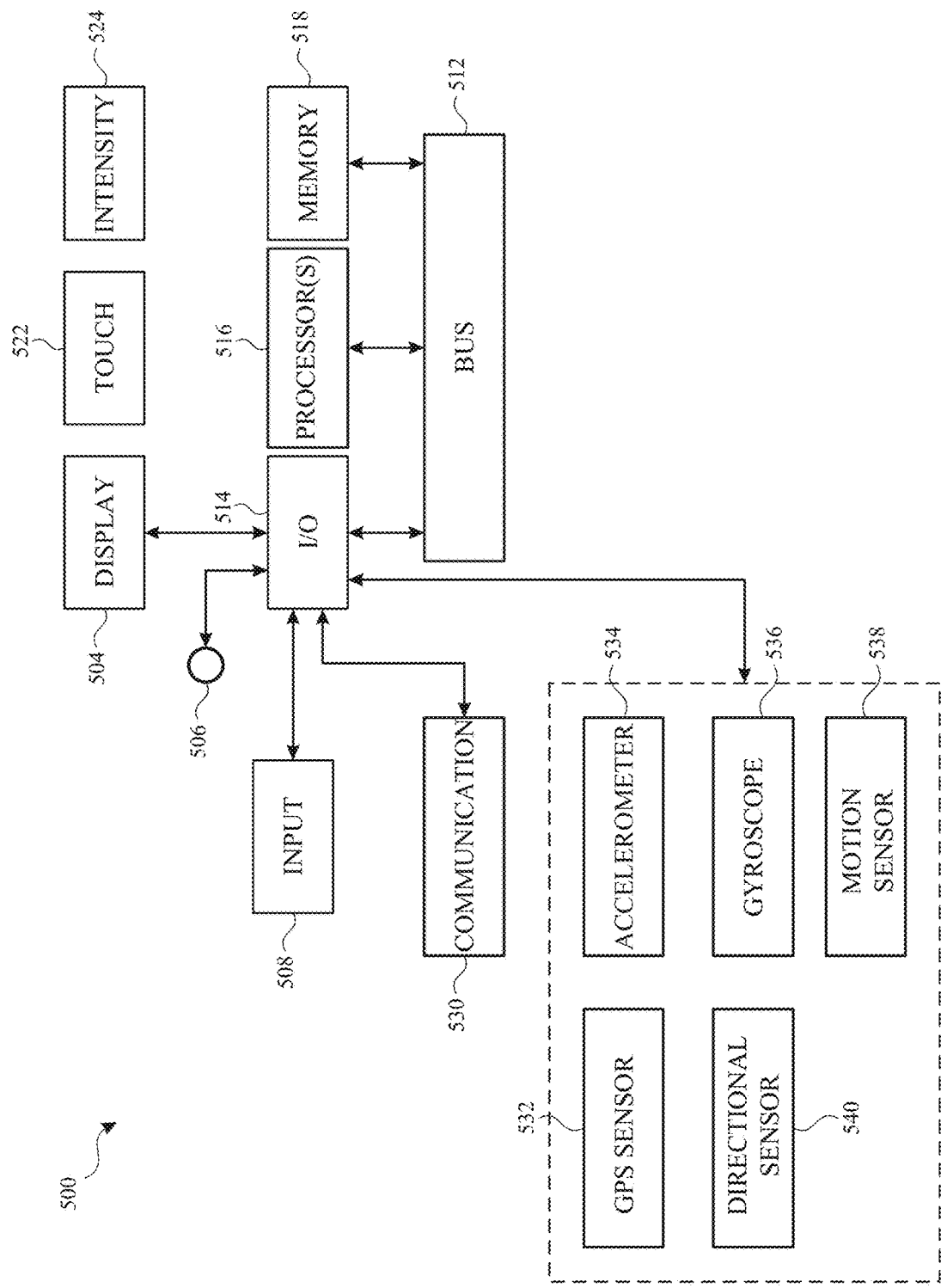
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIGS. 7A-7E). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
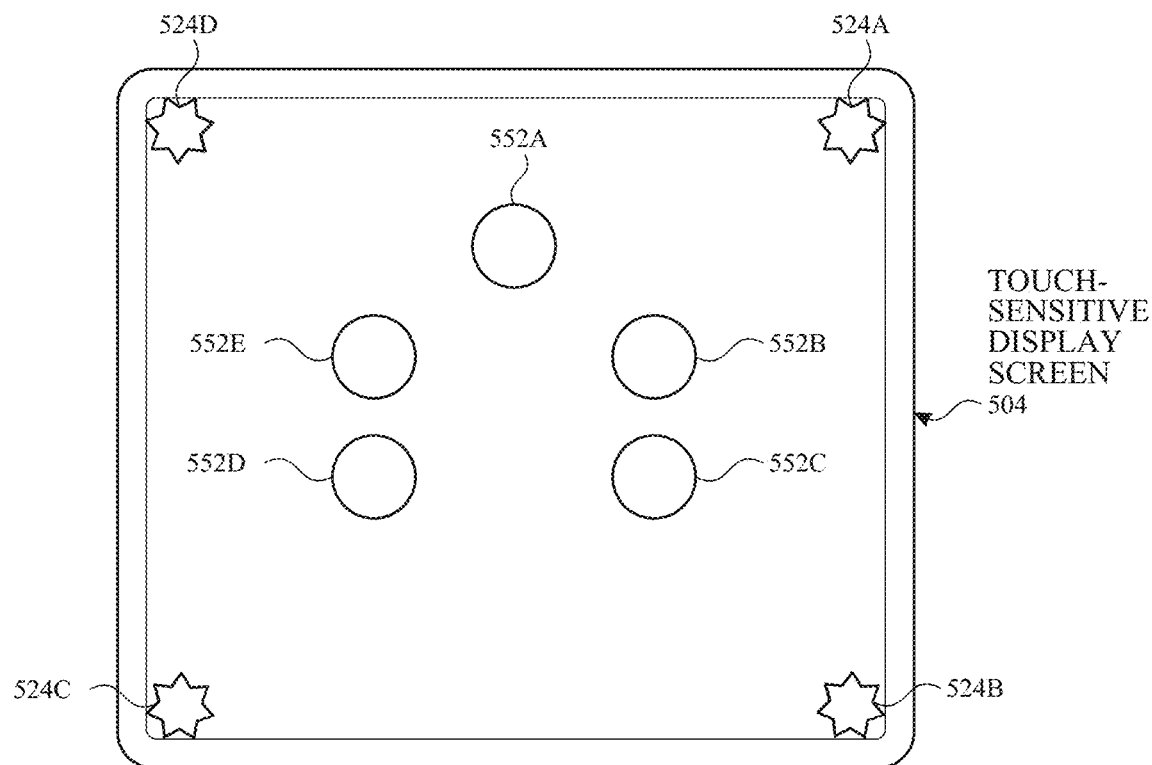
FIGS. 5C-5D illustrate exemplary components of a personal electronic device having a touch-sensitive display and intensity sensors in accordance with some embodiments.
Figure 5C:
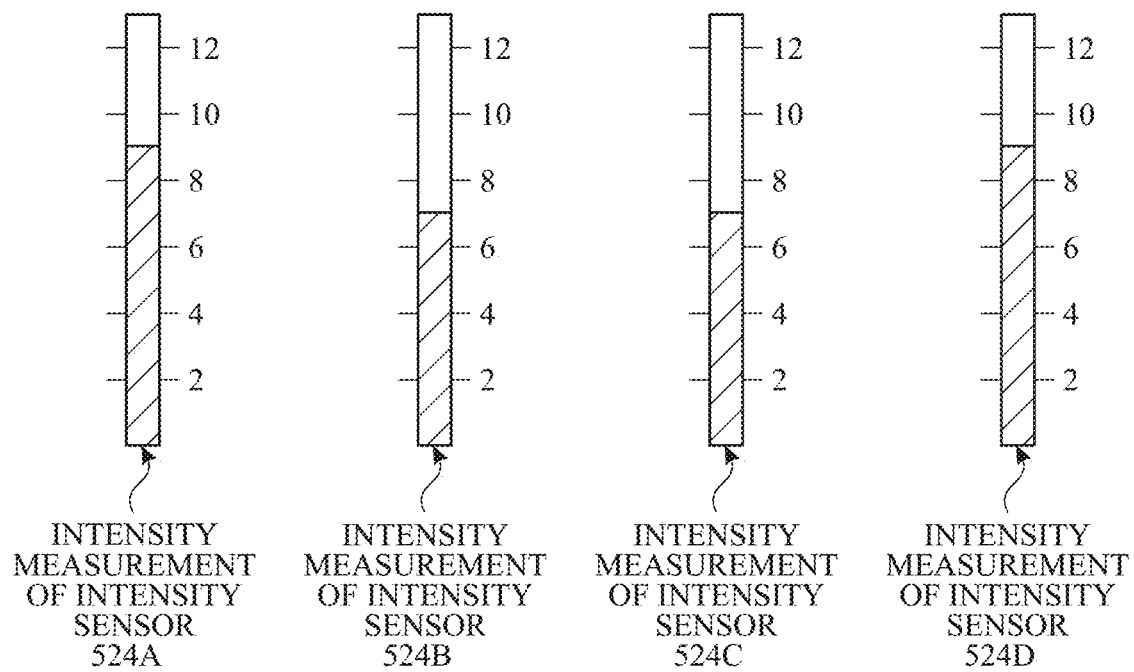
Figure 5D:
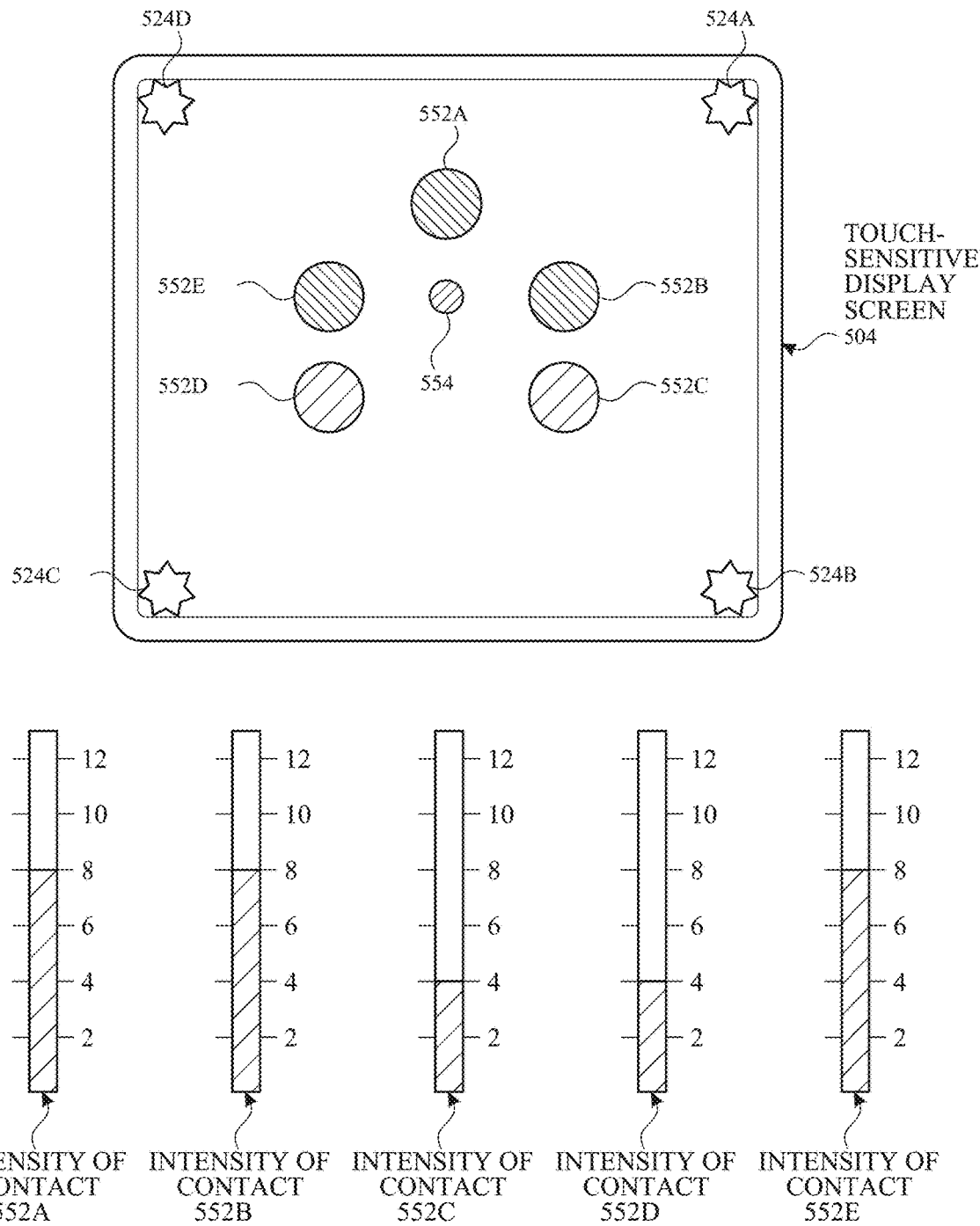

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity $I_j$ that is a portion of the aggregate intensity, A, in accordance with a predefined mathematical function, $I_j = A \cdot (D_j / \Sigma D_i)$, where $D_j$ is the distance of the respective contact j to the center of force, and $\Sigma D_i$ is the sum of the distances of all the respective contacts (e.g., i=1 to last) to the center of force. The operations described with reference to FIGS. 5C-5D can be performed using an electronic device similar to or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
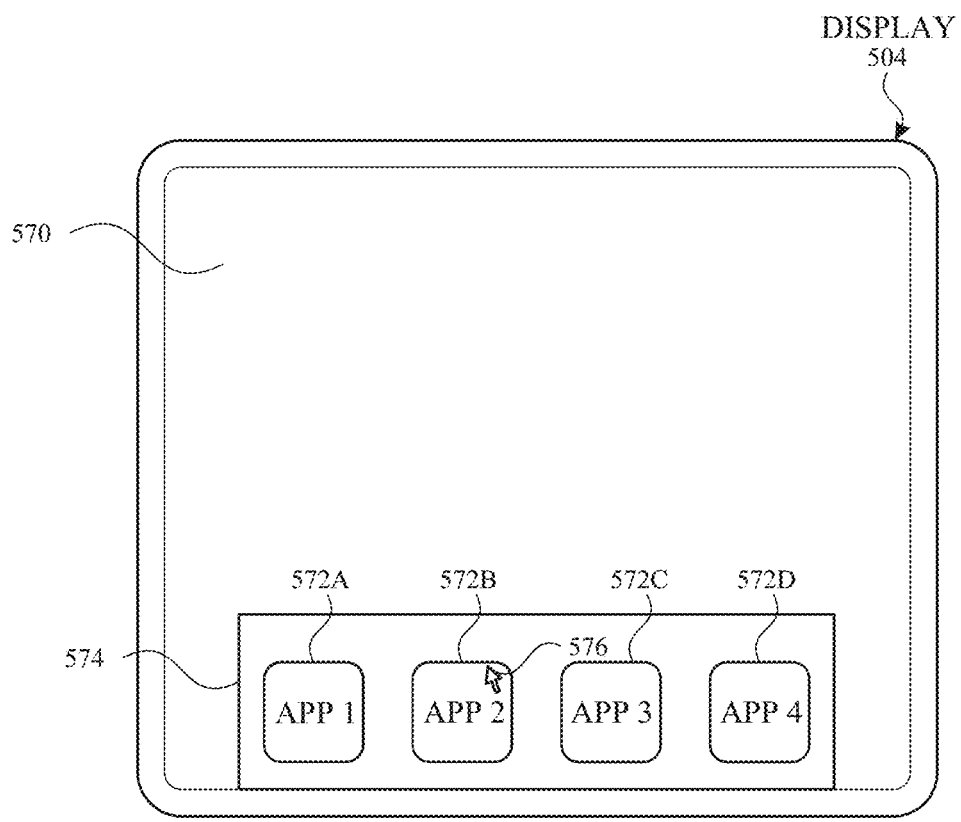
FIGS. 5E-5H illustrate exemplary components and user interfaces of a personal electronic device in accordance with some embodiments.
Figure 5E:
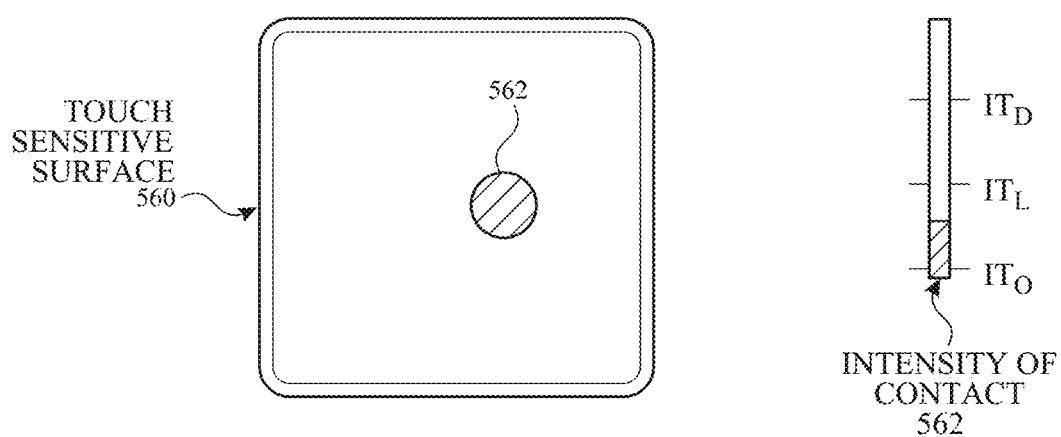
Figure 5F:
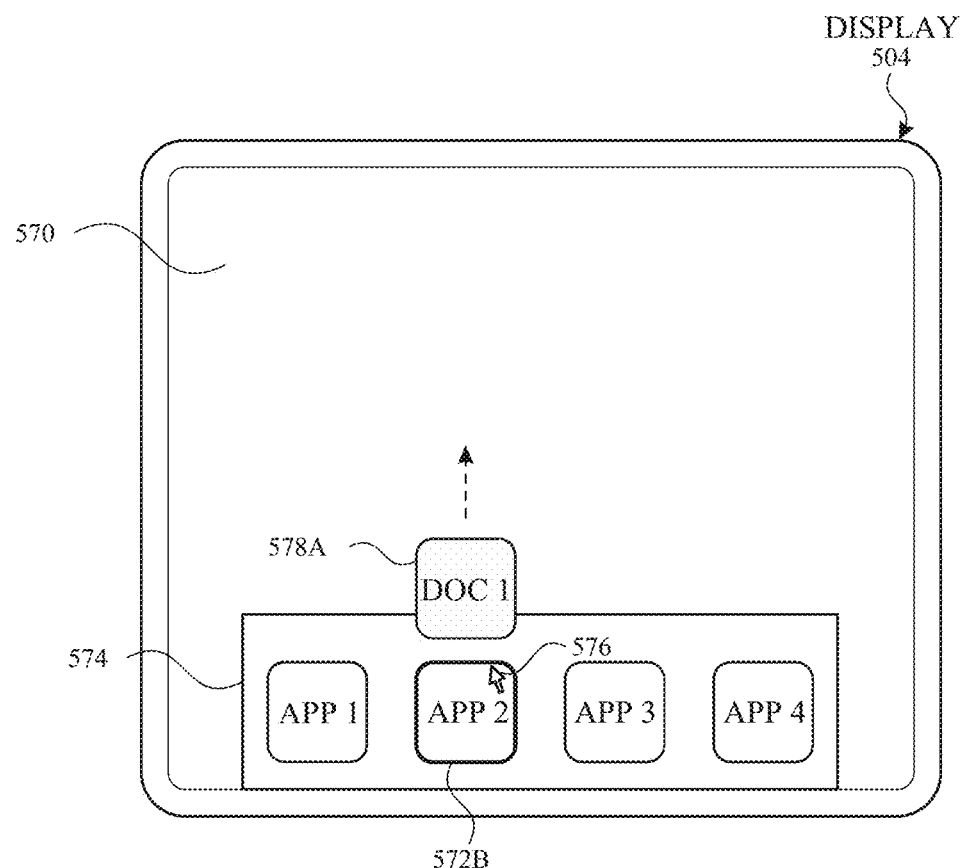
Figure 5F:
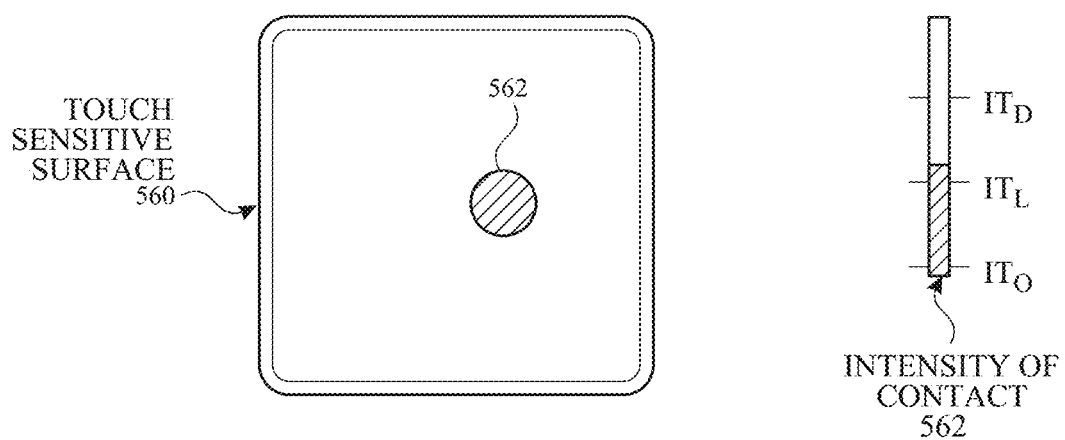
Figure 5G:
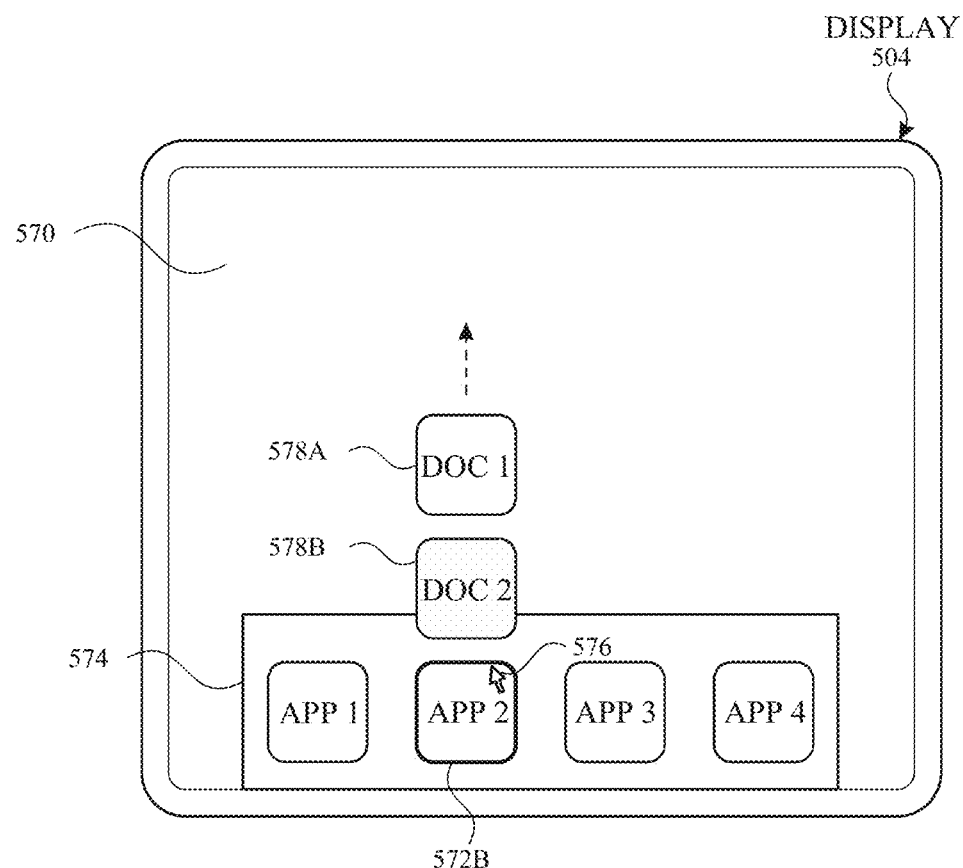
Figure 5G:
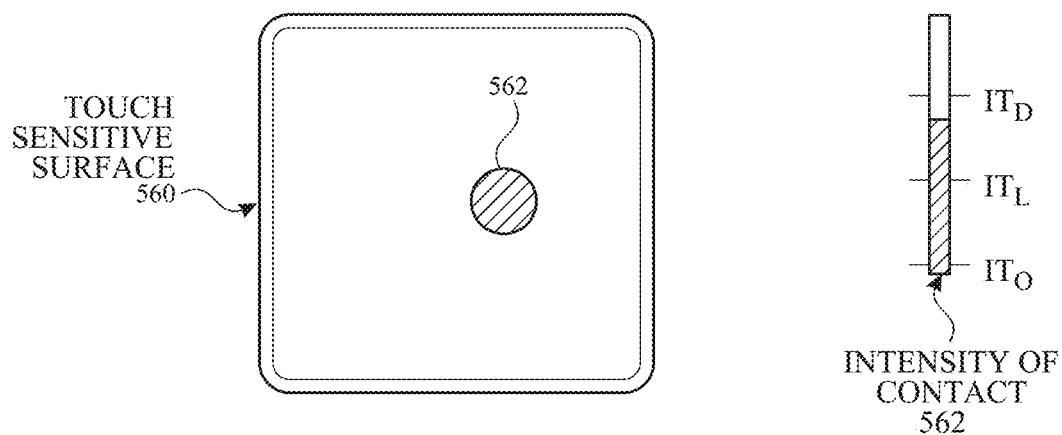
Figure 5H:
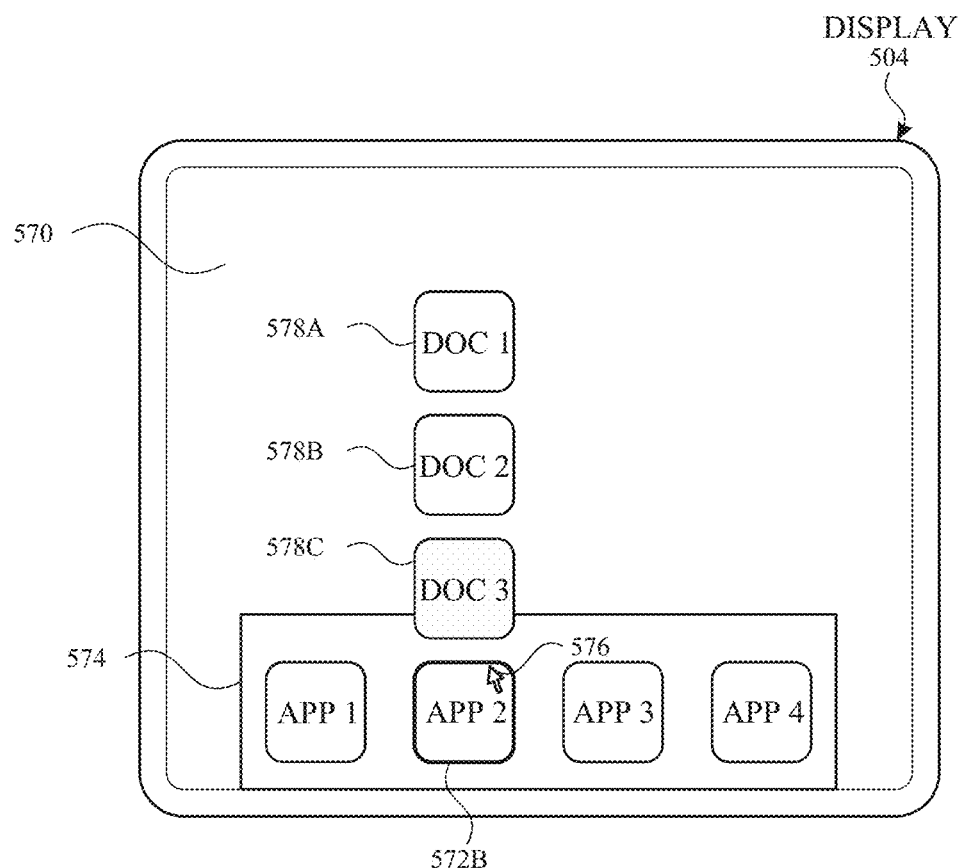
Figure 5H:
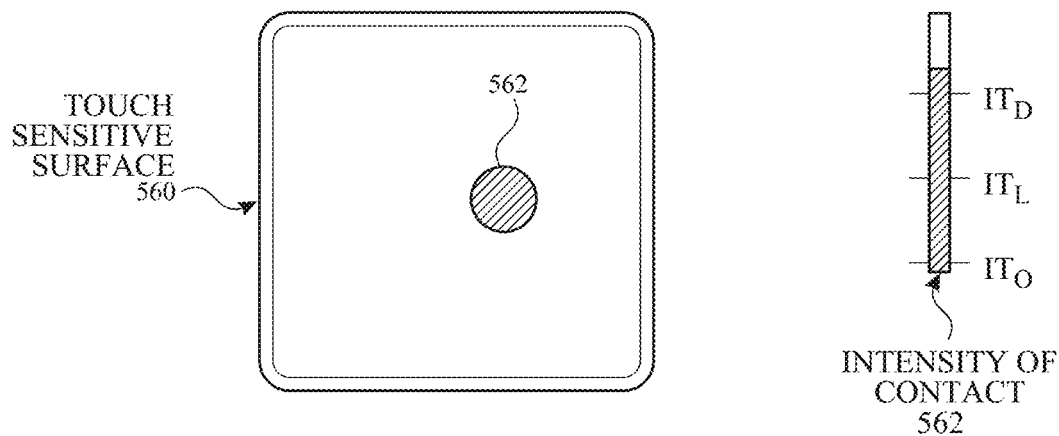

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6Z illustrate exemplary devices and user interfaces for managing input mechanisms, in accordance with some embodiments. The user interfaces in these figures are used to illustrate the processes described below, including the processes in FIGS. 7A-7E.

FIG. 6A illustrates an exemplary electronic device 600 with one or more input mechanisms. In some examples, the electronic device 600 is a smartwatch and includes a first input mechanism (e.g., touch-sensitive display 602), a second input mechanism (e.g., rotatable input mechanism 608), and a third input mechanism (e.g., physical button 612). At FIG. 6A, the electronic device displays, via the touch-sensitive display 602, a home user interface (e.g., 630). The home user interface 630 includes a number of affordances including a time affordance (e.g., 603; "10:09"), a temperature affordance (e.g., 604; "72°"), and calendar reminder affordance (e.g., 606; "12:00-1:00 LUNCH MEETING").

In some examples, the various input mechanisms of the electronic device are associated with different input modalities. In some examples, the first input mechanism (e.g., touch-sensitive display 602) of electronic device 600 is associated with a first input modality (e.g., tap/touch inputs detected via capacitive touch detection). The second input mechanism (e.g., rotatable input mechanism 608) is associated with a second input modality different from the first input modality. In some examples, the second input mechanism is associated with a second input modality (e.g., rotational inputs detected via mechanical actuation detection) that is not based on capacitive touch detection. In some examples, the third input mechanism is associated with a third input modality (e.g., push inputs detected via mechanical actuation detection) that is not based on capacitive touch detection.

In some examples, the electronic device 600 has multiple modes of operation. A given mode of operation can dictate whether each of the various input mechanisms (touch-sensitive display 602, rotatable input mechanism 608, physical button 612) of the electronic device is disabled or enabled for user input, as described in detail herein. Further, the various input mechanisms, when disabled for user input, can respond differently to the detection of a respective input, as described in detail herein.

Figure 6B:
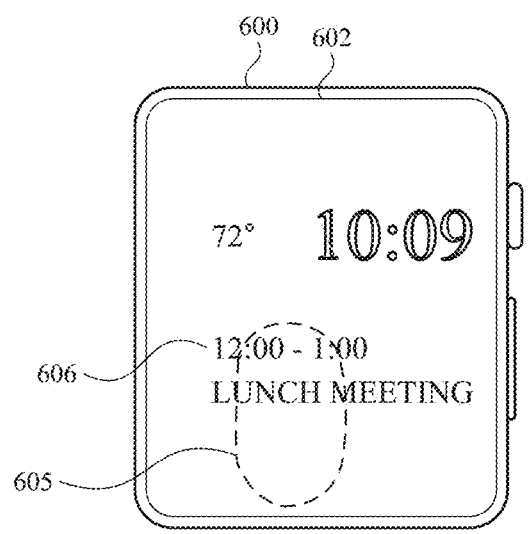

At FIG. 6B, the electronic device 600 is in a second mode of operation (e.g., normal mode). In the second mode (e.g., normal mode), the input mechanisms of the electronic device 600, including the touch-sensitive display 602, the rotatable input mechanism 608, and the physical button 612, are enabled for user input. As depicted in FIG. 6B, while the electronic device 600 is in the second mode, the electronic device 600 detects, via the enabled first input mechanism (e.g., touch-sensitive display 602), an input (e.g., a tap input 605). In the depicted example, the tap input 605 is at a location that corresponds to the calendar reminder affordance (e.g., 606) and is indicative of a selection (or activation) of the calendar reminder affordance (e.g., 606).

Figure 6C:
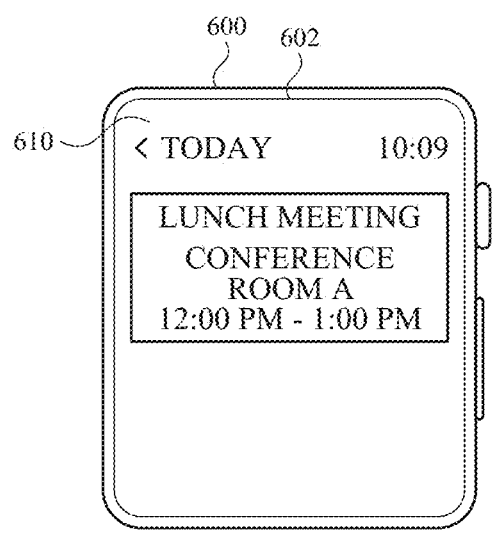

At FIG. 6C, in response to detecting the input (e.g., tap input 605) via the enabled first input mechanism, the electronic device 600 provides an output indicating that the input (e.g., a tap input 605) has been detected. In some examples, when the detected input (e.g., tap input 605) is indicative of a selection of (or corresponds to activation of) an affordance (e.g., calendar reminder affordance 606) displayed on the touch-sensitive display 602, providing an output includes updating display of content on the touch-sensitive display 602 (e.g., displaying calendar detail user interface 610). In some examples, when the input (e.g., a tap input 605) is detected when the touch-sensitive display 602 is inactive (e.g., not providing visual information), the electronic device 600 activates the touch-sensitive display 602 (e.g., providing visual information via the touch-sensitive display 602). In the embodiment of FIG. 6C in particular, electronic device 600 responds to tap input 605 by displaying further details (e.g., location information) regarding the calendar event associated with the calendar reminder affordance 606 of FIG. 6B.

Figure 6D:
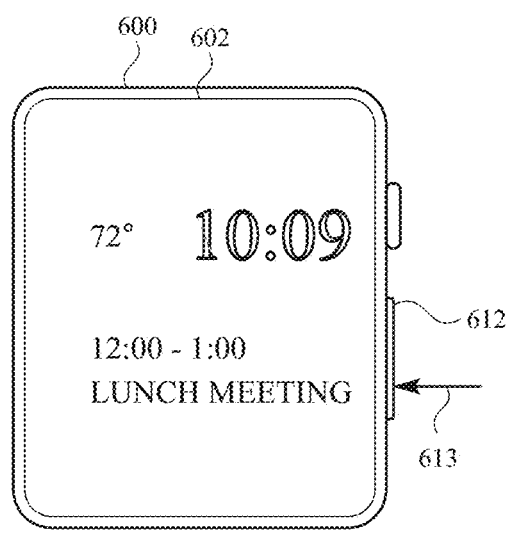

At FIG. 6D, the electronic device 600 is in the second mode of operation (e.g., normal mode), in which the third input mechanism (e.g., physical button 612) are enabled for user input, as discussed above. As depicted in FIG. 6D, while the electronic device 600 is in the second mode, the electronic device 600 detects, via the enabled third input mechanism (e.g., physical button 612), an input (e.g., a push input 613). In the depicted example, the electronic device 600 detects the push input 613 when the touch-sensitive display 602 displays a "home" or home user interface. As such, the electronic device 600 interprets the push input 613 as indicative of a request to access (or activate) a particular user interface (e.g., menu 614 depicted in FIG. 6E).

Figure 6E:
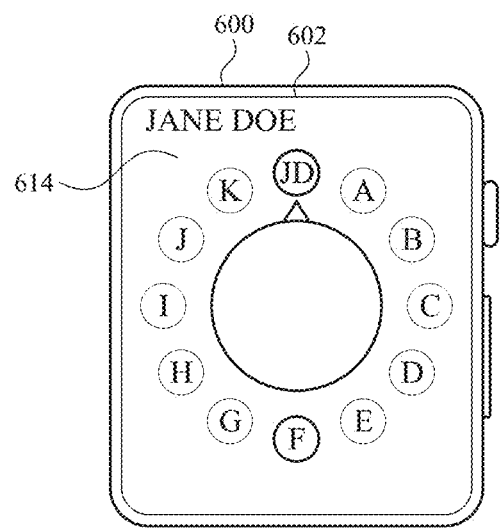

At FIG. 6E, in response to detecting the input (e.g., push input 613) via the enabled third input mechanism (e.g., physical button 612), the electronic device 600 provides an output indicating that the input has been detected. In some examples, when the detected input (e.g., tap input 613) is indicative of a request to access (or activate) a user interface (e.g., menu 614), providing an output includes updating display of content on the touch-sensitive display 602 (e.g., by displaying menu 614). In some examples, when the input (e.g., push input 613) is detected via the third input mechanism (e.g., physical button 612) when the touch-sensitive display 602 is inactive (e.g., not providing visual information), the electronic device 600 activates the touch-sensitive display 602 (e.g., providing visual information via the touch-sensitive display 602) in response to detection of the input. In the embodiment of FIG. 6E in particular, electronic device 600 responds to push input 613 by displaying a menu of contacts (including, for example, contact information associated with contact Jane Doe).

Figure 6F:
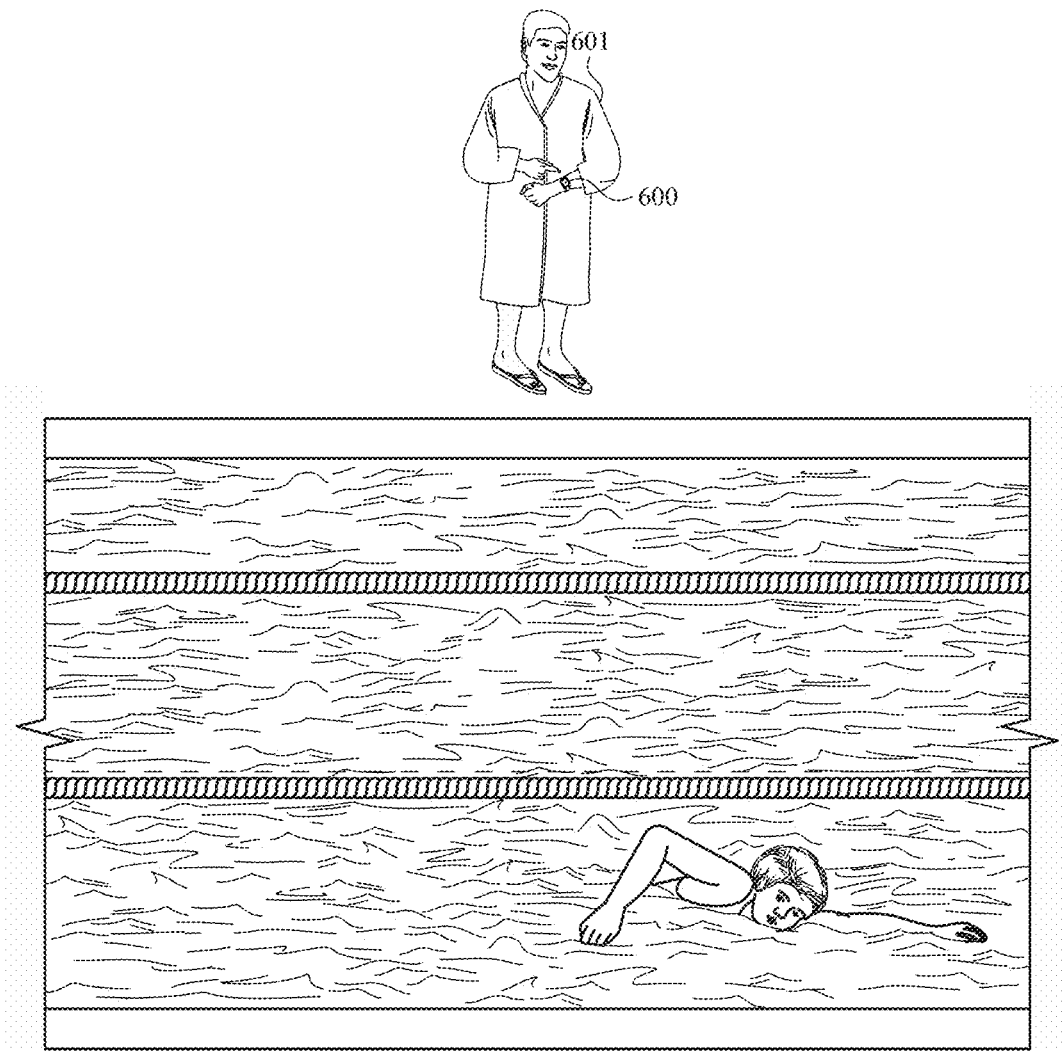

FIG. 6F illustrates an exemplary user scenario where transitioning an electronic device (e.g., 600) from the second mode (e.g., normal mode) into a different/first mode (e.g., special lock mode) is desirable in order to minimize detection and/or processing of inadvertent inputs at various input mechanisms. As depicted, user 601 wears personal device 600 and is about to enter a pool to start a swimming session. Anticipating that the personal device will come in contact with water during the workout session, user 601 provides appropriate input(s) to put the personal device into a special lock mode. In the special lock mode, one or more input mechanisms of personal device are disabled for user input so as to minimize detection and/or processing of inputs triggered by the device's contact with water. For example, a disabled touch-sensitive display of the electronic device 600 does not provide any output in response to force and/or pressure exerted by water on the capacitive touch-sensitive display. Exemplary behaviors of various disabled input mechanisms in the special lock mode are provided herein.

Figure 6G:
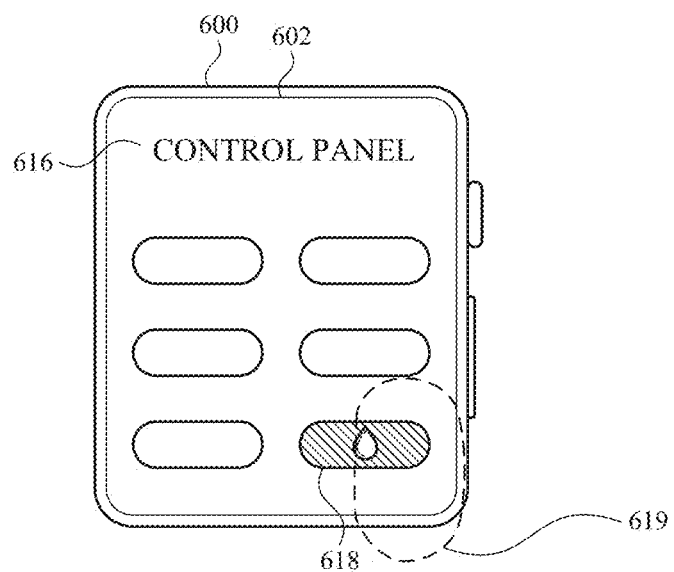

Turning to FIG. 6G, while the electronic device 600 is in the second mode (e.g., normal mode of operation), the electronic device 600 receives an input indicative of a request to enter the first mode (e.g., special lock mode). In some examples, the electronic device 600 displays, via touch-sensitive display 602, a control panel user interface 616, which includes a number of setting affordances including a first mode entering affordance (e.g., 618). In some examples, the input indicative of a request to enter the first mode (e.g., special lock mode) is a tap input (e.g., 619) at a location that corresponds to the first mode entering affordance (e.g., 618).

Figure 6H:
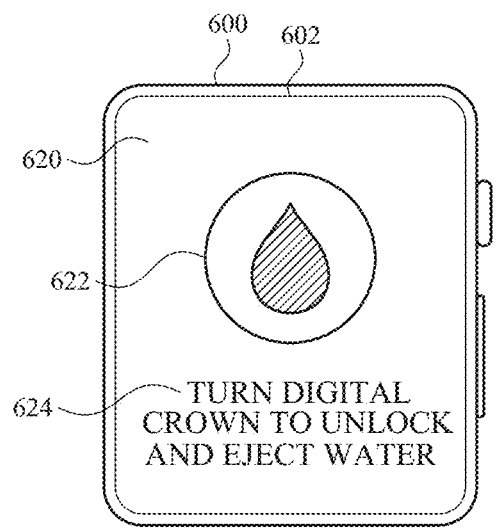

At FIG. 6H, in response to receiving the input (e.g., tap input 619) indicative of a request to enter the first mode (e.g., special lock mode), the electronic device 600 transitions from the second mode (e.g., normal mode) into the first mode (e.g., special lock mode). In some example, after transitioning into the first mode (e.g., special lock mode), the electronic device 600 displays an educational user interface 620 to indicate that the electronic device is in the first mode (e.g., special lock mode). In the depicted example, the educational user interface 620 includes a graphical component (e.g., water-droplet icon 622) and a textual component (e.g., message 624). In some examples, the textual component (e.g., message 624) includes explanation(s) of the first mode of operation, instruction(s) for transitioning the electronic device back into the second mode (e.g., normal mode), and/or introduction(s) of related features of the electronic device 600. In the depicted example, message 624 includes an instruction for transitioning the electronic device back into the second mode ("TURN DIGITAL CROWN TO UNLOCK") and describes a water-expelling feature of the electronic device 600 ("TURN DIGITAL CROWN TO . . . EJECT WATER"). The water-expelling feature is discussed in more detail below.

In some examples, the electronic device 600 displays the educational user interface 620 for a predefined period of time. In some examples, the electronic device 600 displays the educational user interface 620 only after the electronic device transitions into the first mode (e.g., special lock mode) under particular circumstances (e.g., for the first time since the activation of electronic device 600, for the first time during a user session, for the first time since the pairing the electronic device 600 to a different electronic device).

Figure 6I:
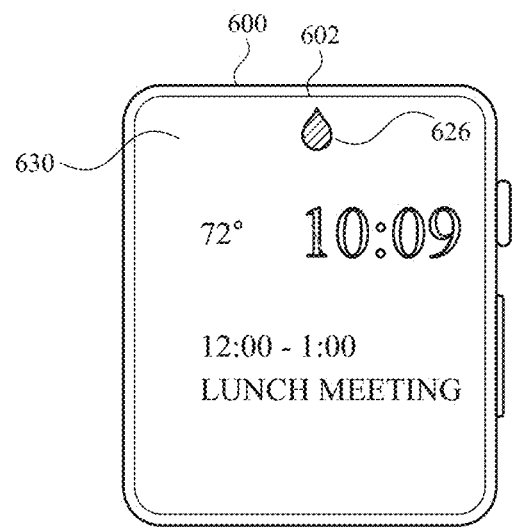

At FIG. 6I, after the electronic device 600 transitions from the second mode (e.g., normal mode) to the first mode (e.g., special lock mode), the electronic device 600 displays, via touch-sensitive display 602, a user interface including an indicator (e.g., 626) associated with the first mode. In the depicted example, the indicator 626 is an icon in the shape of a water droplet and is displayed toward the top portion of the touch-sensitive display 602.

In some examples, after the electronic device transitions from the second mode to the first mode (and optionally displays educational user interface 620), the electronic device 600 displays a user interface previously displayed before transition into the first mode occurs. In the depicted example in FIG. 6I, the electronic device 600 displays, via touch-sensitive display 602, home user interface 630 in addition to the indicator 626. The home user interface 630 was previously displayed before the user provided the input indicative of a request to enter the first mode (e.g., tap input 619 on control panel user interface 616, depicted in FIG. 6G). In some examples, after the electronic device transitions from the second mode to the first mode (and optionally displays educational user interface 620), the electronic device 600 displays a default user interface. In some examples, after the electronic device transitions from the second mode to the first mode (and optionally displays educational user interface 620), the electronic device 600 displays a user interface based on user preferences. In some examples, after the electronic device transitions from the second mode to the first mode, the electronic device 600 inactivates the display (e.g., 602).

Figure 6J:
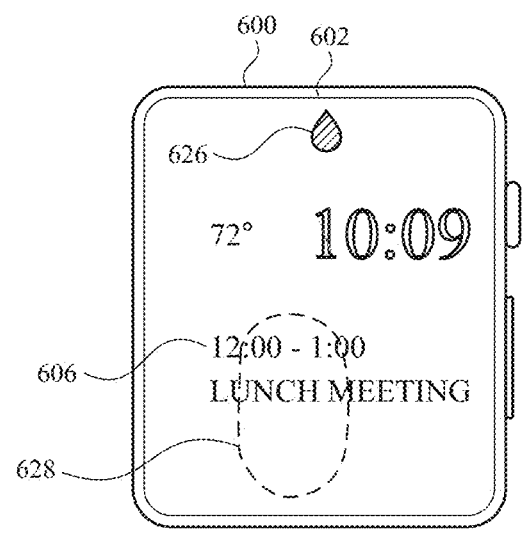

At FIG. 6J, while the electronic device 600 is in the first mode (e.g. special lock mode), the first input mechanism (e.g., touch-sensitive display 602) is disabled for user input (e.g., a tap input 628). In some examples, while the electronic device 600 is in the first mode, the electronic device foregoes detecting user input (e.g., tap input 628) via the disabled first input mechanism (e.g., touch-sensitive display 602) altogether. For example, the hardware (e.g., circuitry) associated with the first input mechanism is not powered. In some examples, while the electronic device 600 is in the first mode (e.g., special lock mode), the electronic device detects user input (e.g., tap input 628) via the disabled first input mechanism (e.g., for logging purposes), but foregoes providing an output indicating that the input has been detected.

Figure 6K:
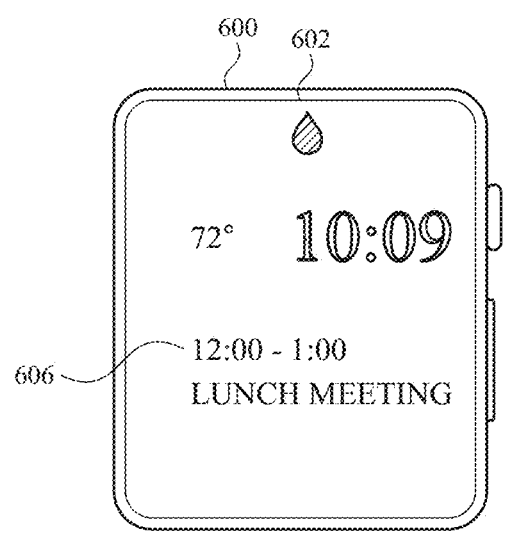

At FIG. 6K, after detecting the input (e.g., tap input 628) via the disabled first input mechanism (e.g., touch-sensitive display 602), the electronic device 600 foregoes providing an output indicating that the input has been detected. In some examples, when the detected input (e.g., tap input 628) is indicative of a selection of (or corresponds to activation of) an affordance (e.g., calendar reminder affordance 606) displayed on the touch-sensitive display 602, the electronic device 600 foregoes updating display of content on the touch-sensitive display 602 (e.g., foregoes displaying calendar detail user interface 610 as depicted in FIG. 6C). In some examples, when the input (e.g., a tap input 628) is detected when the touch-sensitive display 602 is inactive (e.g., not providing visual information), the electronic device 600 foregoes activating the touch-sensitive display 602 (e.g., forgoes providing visual information via the touch-sensitive display 602).

Figure 6L:
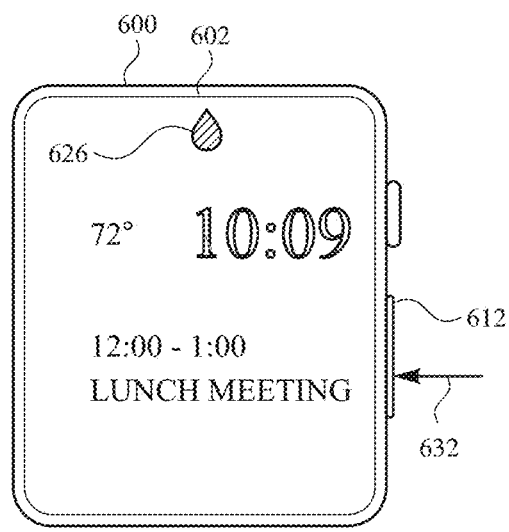

At FIG. 6L, while the electronic device 600 is in the first mode (e.g., special lock mode), the third input mechanism (e.g., physical button 612) is disabled for user input (e.g., push input 632). In some examples, while the electronic device 600 is in the first mode, the electronic device foregoes detecting user input (e.g., push input 632) via the disabled third input mechanism (e.g., physical button 612) altogether. For example, the hardware (e.g., circuitry) associated with the third input mechanism is not powered. In some examples, while the electronic device 600 is in the first mode (e.g., special lock mode), the electronic device detects user input (e.g., push input 632) via the disabled third input mechanism but foregoes performing the functionalities (e.g., displaying menu 614 in response to push input 613 as depicted in FIG. 6E) it would otherwise perform had the electronic device 600 not been in the first mode.

Figure 6M:
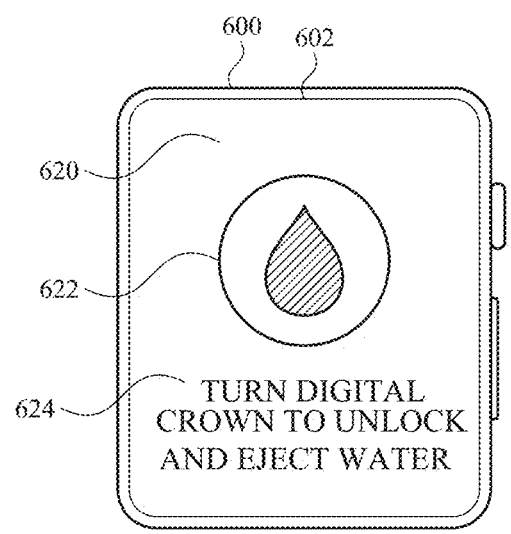

At FIG. 6M, in response to detecting the input (e.g., push input 632) via the third input mechanism (e.g., physical button 612), the electronic device 600 displays, on the touch-sensitive display 602, a user interface indicating that the electronic device is in the first mode (e.g., special lock mode). In the depicted example, the user interface is identical to the educational user interface 620, which includes a graphical component (e.g., 622) and a textual component (e.g., 624), as described above with respect to FIG. 6H. In some examples, the electronic device 600 displays the user interface (e.g., educational user interface 620) in response to the detection of an input via the third input mechanism only for a predefined period of time.

Figure 6N:
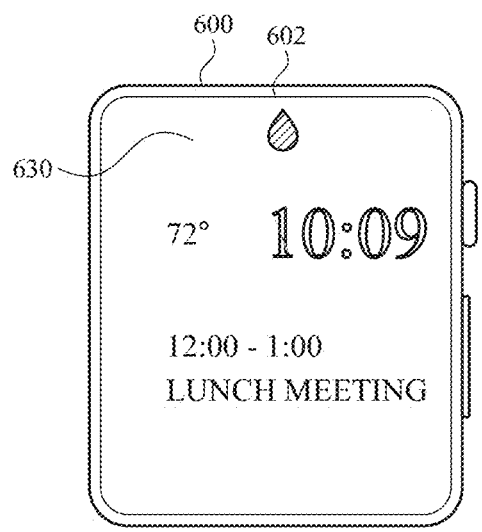

At FIG. 6N, after displaying the educational user interface 620 for the predefined period of time, the electronic device 600 foregoes displaying the educational user interface 620 and displays the user interface (e.g. home user interface 630) that was previously displayed before the user provided the input. In some examples, after displaying the educational user interface 620 for the predefined period of time, the electronic device 600 foregoes displaying the educational user interface 620 and deactivates the display (e.g., 602).

Figure 6O:
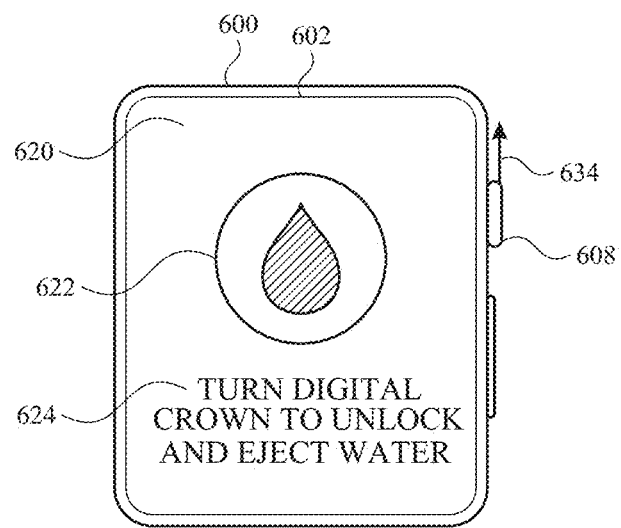

At FIG. 6O, while the electronic device 600 is in the first mode (e.g., special lock mode), the electronic device detects an input (e.g., rotational input 634) via the second input mechanism (e.g., rotational input mechanism 608). In some examples, while continuing to detect the input (e.g., rotational input 634) via the second input mechanism, the electronic device 600 provides an output (e.g., a visual output, a tactile output, or an audio output, or a combination thereof) indicative of an ongoing transition from the first mode (e.g., special lock mode) into the second mode (e.g., normal mode). In some examples, the output indicative of an ongoing transition is an animation. In the depicted example in FIG. 6O, the electronic device 600 starts the playing of the animation by displaying, via touch-sensitive display 602, the educational user interface 620 including a graphical component (e.g., 622) and a textual component (e.g., 624).

In some examples, the electronic device 600 only provides an output indicative of an ongoing transition after determining that the input (e.g., rotational input 634) meets an initial set of predefined criteria. The initial set of criteria represents a threshold for initiating (or providing an indication of initiating) a transition from the first mode to the second mode. In some examples, while the electronic device continues to detect the input (e.g., rotational input 634) detected via the second input mechanism (e.g., rotational input mechanism 608), the electronic device determines whether one or more characteristics of the rotation of the second input mechanism meet the initial set of predefined criteria. In accordance with a determination that the one or more characteristics of the input (e.g., rotational input 634) meet the initial set of predefined criteria, the electronic device provides an output indicative of an ongoing transition from the first mode to the second mode (e.g., an animation that begins with educational user interface 630). In accordance with a determination that the one or more characteristics of the input (e.g., rotational input 634) does not meet the initial set of predefined criteria, the electronic device does not (or foregoes) providing the output indicative of an ongoing transition from the first mode to the second mode.

In some examples, the one or more characteristics of the rotation include a speed of the input (e.g., rotational input 634), a duration of the input (e.g., rotational input 634), a direction of the input (e.g., rotational input 634), a rotational distance of the input (e.g., rotational input 634), a magnitude of the input (e.g., rotational input 634), or a combination thereof. In some examples, the initial set of predefined criteria includes a threshold speed, a threshold duration, a predefined direction, a threshold distance, a threshold magnitude, or a combination thereof.

Figure 6P:
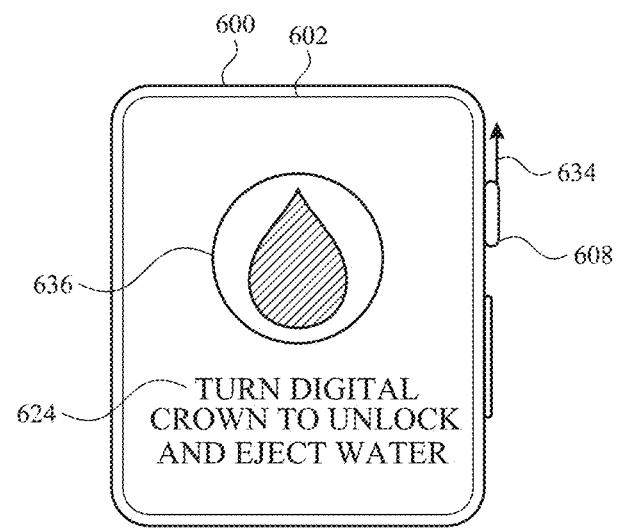
Figure 6Q:
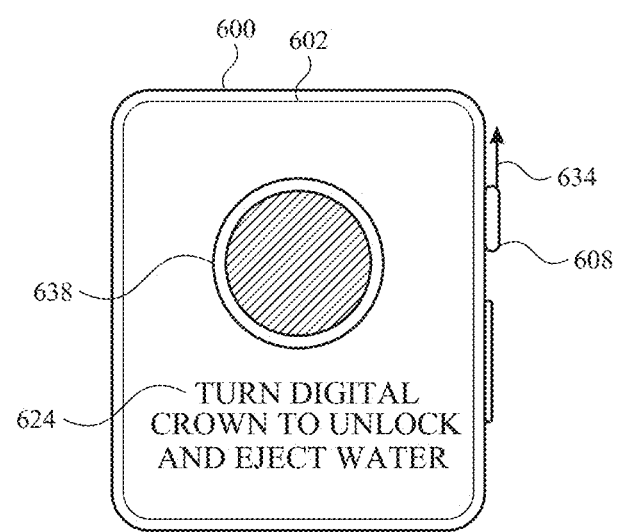

At FIGS. 6P and 6Q, the electronic device 600 continues to provide the output indicative of an ongoing transition from the first mode to the second mode. In the depicted example, the electronic device 600 displays the animation of an expanding water droplet (as illustrated by graphical components 636 and 638). In some examples, the electronic device 600 displays the animation of a fading textual component 624 (fading not depicted in FIGS. 6P and 6Q).

After detecting the input (e.g., rotational input 634) via the second input mechanism (e.g., rotational input mechanism 608), the electronic device determines whether one or more characteristics of the input meet a set of predefined criteria (e.g., different from the initial set of predefined criteria). The set of predefined criteria represents a threshold for transitioning the electronic device from the first mode (e.g., special lock mode) into the second mode (e.g., normal mode). In the depicted example, while continuing to detect the rotation of the second input mechanism, the electronic device 600 determines whether one or more characteristics of the rotation of the second input mechanism meet the set of predefined criteria.

Notably, to prevent the electronic device from transitioning into the second mode (e.g., normal mode) due to inadvertent inputs (e.g., caused by water), two requirements should be met before the electronic device 600 enters the second mode. First, the electronic device 600 detects the input (e.g., rotational input 634) via the second input mechanism (e.g., rotational input mechanism 608). Second, the electronic device 600 determines whether one or more characteristics of the input meet a set of predefined criteria. Mere detection of the input via the second input mechanism (which could be triggered by, e.g., contact with water) is insufficient for triggering the transition into the second mode.

In some examples, the one or more characteristics of the rotation include a speed of the input (e.g., rotational input 634), a duration of the input (e.g., rotational input 634), a direction of the input (e.g., rotational input 634), a rotational distance of the input (e.g., rotational input 634), a magnitude of the input (e.g., rotational input 634), or a combination thereof. In some examples, the set of predefined criteria includes a threshold speed (e.g., larger than that of the initial set of predefined criteria), a threshold duration (e.g., larger than that of the initial set of predefined criteria), a predefined direction, a threshold distance (e.g., larger than that of the initial set of predefined criteria), a threshold magnitude (e.g., larger than that of the initial set of predefined criteria), or a combination thereof. In some examples, the set of predefined criteria is different from the initial set of predefined criteria.

Figure 6R:
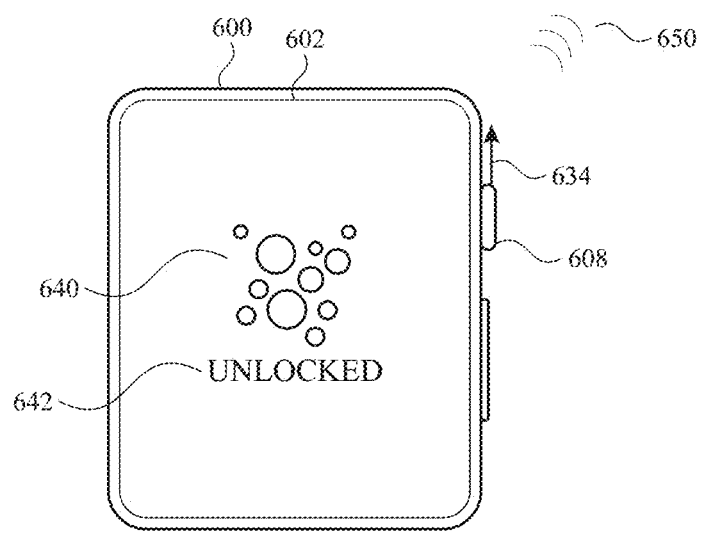

At FIG. 6R, in accordance (or in response to) with a determination that the one or more characteristics of the input (e.g., rotational input 634) detected via the second input mechanism meet the set of predefined criteria, the electronic device 600 transitions into the second mode (e.g., normal mode). In some examples, the electronic device 600 provides an output (e.g., a visual output, a tactile output, or an audio output, or a combination thereof) indicative of a successful transition from the first mode to the second mode. In the depicted example, the output includes an animation of a bursting water droplet 640 and a textual message 642 ("UNLOCKED"). In some examples, the electronic device 600 displays the animation for a predefined period of time.

In some examples, the electronic device 600 has a water-expelling feature to eject water from a speaker of the electronic device using sound emission. In accordance with the determination that the one or more characteristics of the input (e.g., rotational input 634) detected via the second input mechanism meet the set of predefined criteria, the electronic device 600 emits a sound (e.g., sound 650) via the speaker of the electronic device. The sound (e.g., 650) is configured to expel liquid from the speaker of the electronic device.

In some examples, at least a portion of the sound (e.g., 650) has a predefined frequency or a predefined range of frequencies sufficient to expel water from the speaker. In some examples, the sound (e.g., 650) has a predefined duration.

In some examples, while emitting the sound (e.g., 650), the electronic device simultaneously provides the output (e.g., a visual output, a tactile output, or an audio output) indicative of successful transition from the first mode to the second mode (e.g. an animation of a bursting water droplet). In the depicted example, the electronic device 600 emits the sound (e.g., 650) via the speaker while displaying the animation of bursting water droplet via the display (e.g., 602).

In some examples, the electronic device 600 displays a message about the water expelling feature (e.g., "TURN DIGITAL CROWN TO UNLOCK AND EJECT WATER"). In some examples, the message is part of the user interface displayed when the electronic device 600 transitions into the first mode, described with respect to FIG. 6H. In some examples, the message is as part of the user interface (e.g., 620) displayed in response to an input (e.g., push input 632) detected via the third input mechanism (e.g. physical button 612), described with respect to FIG. 6M. In some examples, the message is part of the user interface (e.g., 620) displayed in response to an input (e.g., rotational input 634) detected via the second input mechanism (e.g. rotational input mechanism 608), described with respect to FIG. 6O.

Figure 6S:
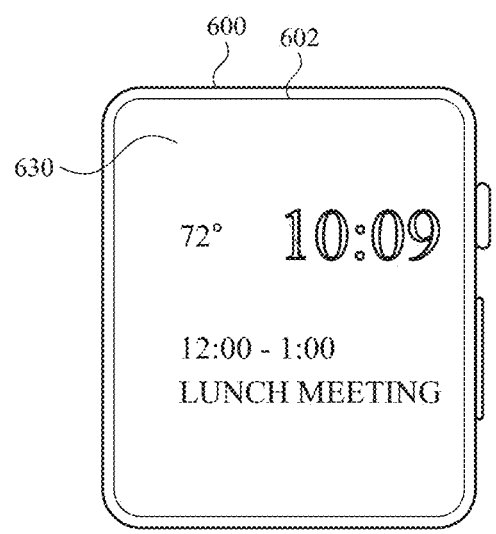

At FIG. 6S, after a successful transition from the first mode (e.g., special lock mode) to the second mode (e.g., normal mode), the electronic device 600 displays a user interface that does not include an indicator (e.g., 626) associated with the first mode.

In some examples, after the electronic device transitions from the first mode to the second mode, the electronic device 600 displays a user interface previously displayed before the electronic devices transitioned into the first mode (e.g., the user interface displayed before the user provides an input to launch control panel user interface 619). In some examples, after the electronic device transitions from the first mode to the second mode, the electronic device 600 displays a user interface previously displayed while the electronic device was in the first mode. In the depicted example in FIG. 6S, the electronic device 600 displays, via touch-sensitive display 602, home user interface 630. The home user interface 630 was displayed while the electronic device was in the first mode before the user provided the rotational input 634. In some examples, after the electronic device transitions from the first mode to second first mode, the electronic device 600 displays a default user interface. In some examples, after the electronic device transitions from the first mode to the second mode, the electronic device 600 displays a user interface based on user preferences.

In accordance with (or in response to) a determination that the one or more characteristics of the input (e.g., rotational input 634) detected via the second input mechanism do not meet the set of predefined criteria, the electronic device 600 remains in the first mode and foregoes transitioning into the second mode. For example, if the rotational input 634 is terminated before reaching a threshold rotational distance, the electronic device 600 forgoes the transitioning into the second mode. In some examples, the electronic device provides an output indicative of a failed transition from the first mode to the second mode. For example, the electronic device 600 displays a reversal of the output indicative of an ongoing transition as described with respect to FIGS. 6O-6Q (e.g., animation of a shrinking water droplet).

Figure 6T:
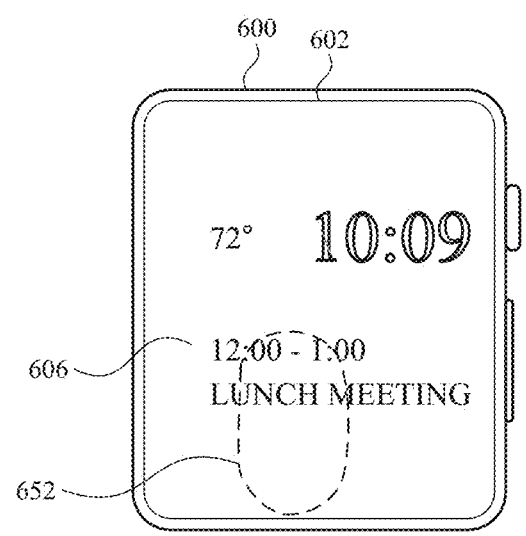

At FIG. 6T, while the electronic device 600 is in the second mode (e.g., normal mode), the first input mechanism (e.g., touch-sensitive display 602) is enabled for user input. As depicted, the electronic device 600 detects, via the enabled first input mechanism, an input (e.g., tap input 652). The tap input 652 is at a location that corresponds to the calendar reminder affordance (e.g., 606) and is indicative of a selection (or activation) of the calendar reminder affordance (e.g., 606).

Figure 6U:
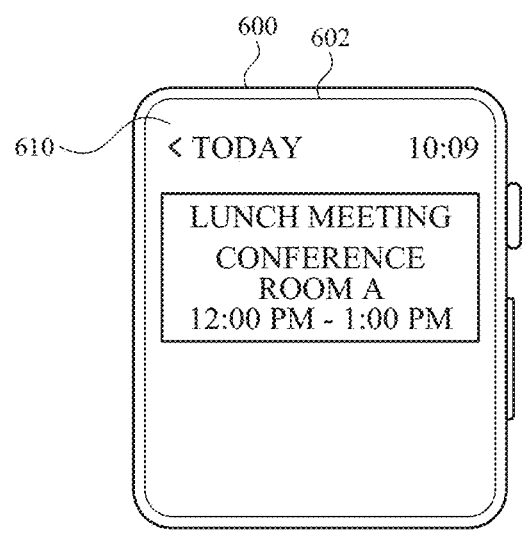
Figure 6V:
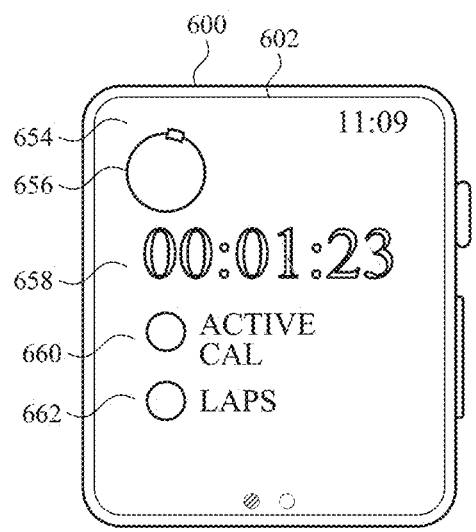

At FIG. 6U, in response to detecting the input (e.g., tap input 652) via the enabled first input mechanism, the electronic device 600 provides an output indicating that the input (e.g., a tap input 652) has been detected (e.g., by displaying calendar detail user interface 610), similar to the operation of the electronic device 600 as depicted in FIGS. 6B and 6C.

FIGS. 6V-6Z provide additional exemplary user interfaces for providing the special lock mode at electronic device 600. At FIG. 6V, the electronic device 600 displays, via the display (touch-sensitive display 602), a swimming user interface 654. In the depicted example, the swimming user interface 654 is part of a workout-related application of the electronic device 600. As depicted, the swimming user interface 654 provides information relating to an ongoing workout session (e.g., a swimming session), including progress indicator 656, time value 658, calorie value 660, and lap value 662.

Figure 6W:
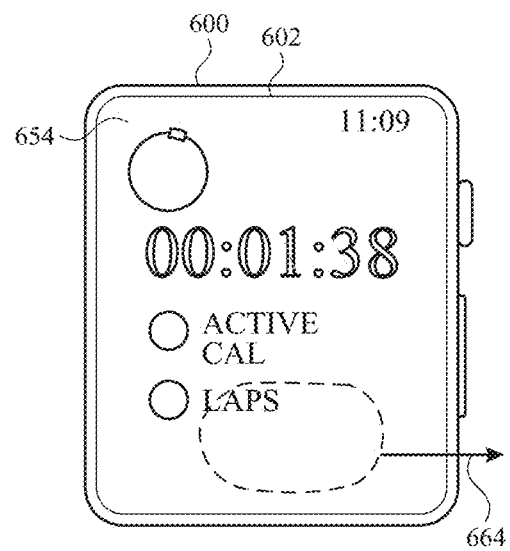

At FIG. 6W, the electronic device 600 detects, via the first input mechanism (touch-sensitive display 602), an input indicative of a request to display a workout setting user interface. In some examples, the input comprises a finger swipe gesture (e.g., 664). In some examples, the input comprises a press input having a predefined intensity.

Figure 6X:
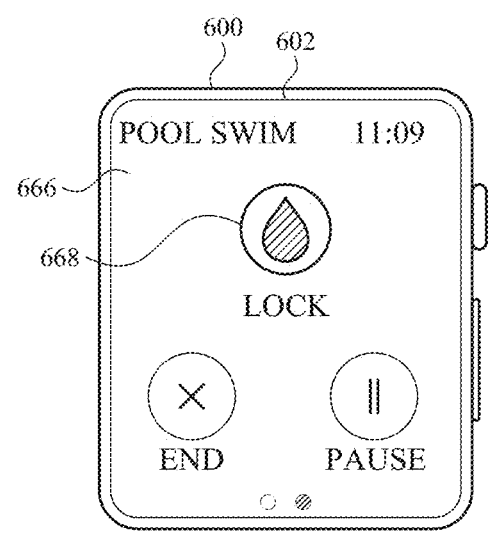

At FIG. 6X, in response to the detection of the input (finger swipe gesture 664 in FIG. 6W), the electronic device 600 displays the workout setting user interface 666. The workout setting user interface provides a number of workout setting affordances, including a first mode entering affordance 668. In the depicted example, the first mode entering affordance 668 includes an icon in the shape of a water droplet. In some examples, the icon associated with the first mode entering affordance 668 is different from the icon associated with the first mode entering affordance 618 of control panel user interface 616, described with respect to FIG. 6G.

Figure 6Y:
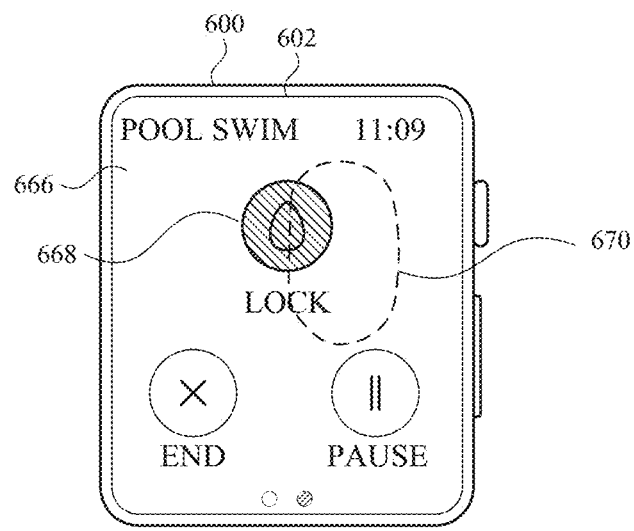
Figure 6Z:
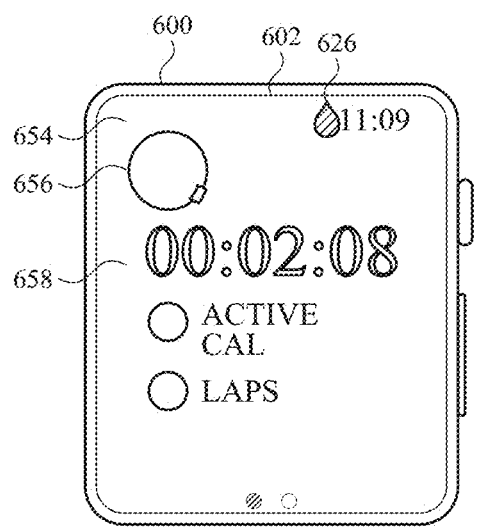
Figure 7A:
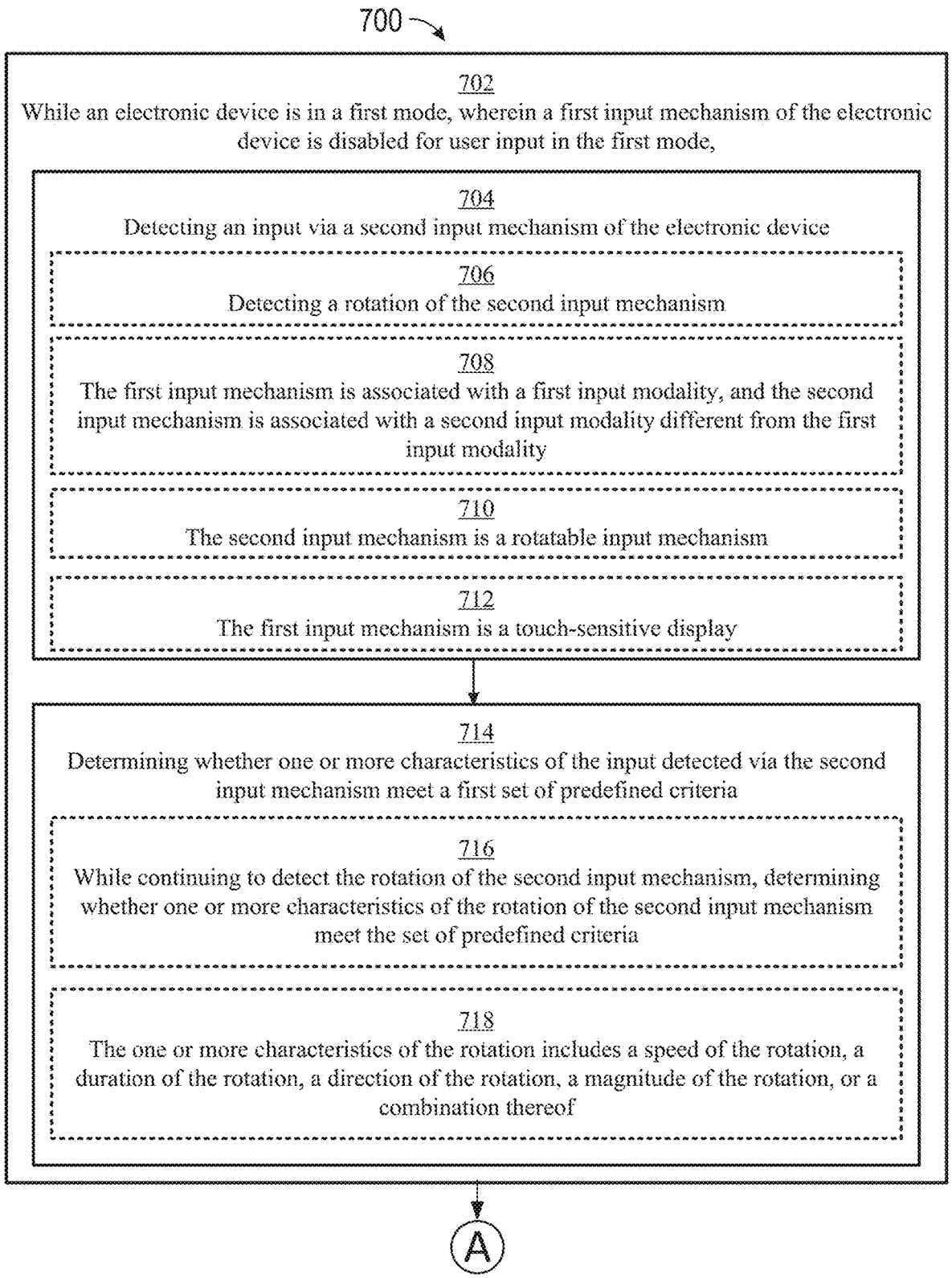
Figure 7D:
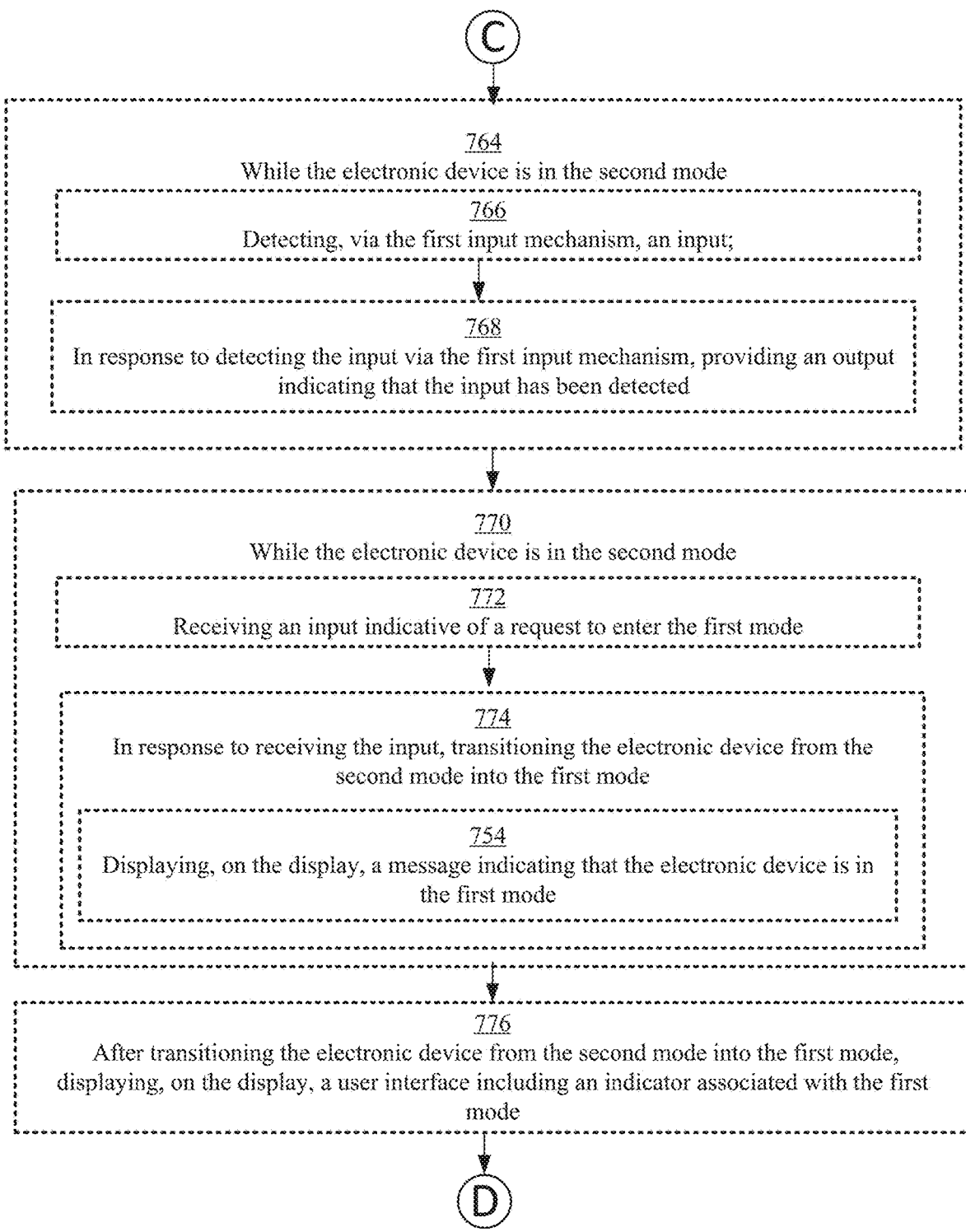

At FIG. 6Y, the electronic device 600 detects, via the first input mechanism (touch-sensitive display 602), an input (e.g., tap input 670) indicative of a request to transition the electronic device into the first mode (e.g., special lock mode). In the depicted example, the electronic device 600 provides an indication that the first mode entering affordance 668 has been selected by updating the display of the first mode entering affordance 668. In some examples, the electronic device 600 displays a grayed out version of the icon associated with the first mode entering affordance 668. In some examples (not depicted), the electronic device 600 updates the icon associated with the first mode entering affordance with a different icon (e.g., in the shape of a lock).

At FIG. 6Z, the electronic device 600 transitions into the first mode (e.g., special lock mode). In some examples, the electronic device 600 switches the display of touch-sensitive display 602 from the workout setting user interface 666 to the swimming user interface 654. While the electronic device is in the first mode, the swimming user interface 654 includes an indicator (e.g., 626) associated with the first mode.

Importantly, in some examples, a transition of the electronic device 600 from the second mode (e.g. normal mode) into the first mode (e.g., special lock mode) only disable a predefined set of functionalities but does not affect other functionalities/operations of the electronic device. In some examples, current operations by active applications and/or background applications of the electronic device (e.g., playing music, providing notifications, tracking ongoing workout session) are not suspended due to the transition into the first mode. As depicted in FIG. 6Z, while in the first mode (e.g., special lock mode), the electronic device 600 continues to track the ongoing swimming session (e.g., by updating progress indicator 656 and time value 658).

The examples provided above with respect to FIGS. 6A-6Z are merely exemplary. The first mode of operation (e.g., special lock mode) can be activated by a variety of input mechanisms (visual, tactile, audio, or a combination thereof) via a variety of user interfaces. While the electronic device is in the first mode (e.g., special lock mode), a variety of input mechanisms can be disabled for user input. Further, the various disabled input mechanisms can respond differently to the detection of a respective user input, as illustrated above with respect to the first input mechanism, the second input mechanism, and the third input mechanisms (FIGS. 6J-6O).

FIGS. 7A-7E provide a flow diagram illustrating a method for managing input mechanisms using an electronic device in accordance with some embodiments. Method 700 is performed at a device (e.g., 100, 300, 500, and 600) with a first input mechanism, a second input mechanism, and optionally, a third input mechanism, a display, and a speaker. In some examples, the first input mechanism and the display are the same unit. Some operations in method 700 are, optionally, combined, the order of some operations is, optionally, changed, and some operations are, optionally, omitted.

At block 702, the electronic device (e.g., 600) is in a first mode (e.g., special lock mode). In some examples, the first input mechanism (e.g., touch-sensitive display 602) of the electronic device is disabled for user input in the first mode (e.g., special lock mode). In some embodiments, disabling one or more input mechanisms minimizes detection and/or processing of inputs that are not intended by the user (e.g., unintentional inputs caused by the action of water on capacitive touch screens). By doing so, the accuracy of the machine-human interface is improved. Moreover, doing so conserves device energy, which in battery-operated devices, is of particular importance.

At block 704, the electronic device detects an input (e.g., rotational input 634) via the second input mechanism (rotational input mechanism 608). In some examples, at block 706, detecting the input (e.g., rotational input 634) via the second input mechanism (e.g., rotational input mechanism 608) comprises detecting a rotation of the second input mechanism (rotational input mechanism 608).

In some examples, at block 708, the first input mechanism (e.g., touch-sensitive display 602) of electronic device 600 is associated with a first input modality (e.g., tap/touch inputs detected via capacitive touch detection), and the second input mechanism (e.g., rotatable input mechanism 608) is associated with a second input modality different from the first input modality. In some examples, the second input mechanism is associated with an input modality (e.g., rotational inputs detected via mechanical actuation detection) that is not based on capacitive touch detection. In some embodiments, input detection via the second input mechanism (e.g., rotatable input mechanism) is less likely to be triggered by environmental factors such as water than input detection via the first input mechanism (e.g., capacitive touch screen). By providing the second input mechanism as the input mechanism for transitioning out of the first mode, the accuracy of the machine-human interface is improved. Moreover, doing so conserves device energy, which in battery-operated devices, is of particular importance.

In some examples, at block 710, the second input mechanism is a rotatable input mechanism (e.g., rotational input mechanism 608). In some examples, at block 712, the first input mechanism is a touch-sensitive display (e.g., touch-sensitive display 602).

At block 714, the electronic device (e.g., 600) determines whether one or more characteristics of the input (e.g., rotational input 634) detected via the second input mechanism (e.g., rotational input mechanism 608) meet a set of predefined criteria. As discussed above, in some embodiments, to prevent the electronic device from transitioning into the second mode (e.g., normal mode) due to inadvertent inputs (e.g., caused by water), two requirements should be met before the electronic device 600 enters the second mode. First, the electronic device detects (e.g., at block 704) the input (e.g., rotational input 634) via the second input mechanism (e.g., rotational input mechanism 608). Second, the electronic device determines whether one or more characteristics of the input meet a set of predefined criteria. Mere detection of the input via the second input mechanism (which could be triggered by, e.g., contact with water or brief, unintentional user action) is insufficient for triggering the transition into the second mode. By doing so, the likelihood that mode transition is triggered by environmental factors (e.g., water) is minimized and the accuracy of the machine-human interface is improved.

In some examples, the detected input is a rotation of the second input mechanism (e.g., rotational input mechanism 608). At block 716, the electronic device (e.g., 600), while continuing to detect the rotation of the second input mechanism (rotational input mechanism 608), determines whether one or more characteristics of the rotation of the second input mechanism (e.g., rotational input mechanism 608) meet the set of predefined criteria.

In some examples, at block 718, the one or more characteristics of the rotation includes a speed of the rotation, a duration of the rotation, a direction of the rotation, a magnitude of the rotation, or a combination thereof. In some examples, the set of predefined criteria includes a threshold speed, a threshold duration, a predefined direction, a threshold magnitude, or a combination thereof.

In some examples, the set of predefined criteria is a first set of predefined criteria. At block 736, while continuing to detect the rotation (e.g., rotational input 634) of the second input mechanism (rotational input mechanism 608), the electronic device (e.g., 600) determines whether one or more characteristics of the rotation of the second input mechanism (e.g., rotational input mechanism 608) meet a second set of predefined criteria different from the first set of predefined criteria.

In some examples, the one or more characteristics of the rotation includes a speed of the rotation, a duration of the rotation, a direction of the rotation, a magnitude of the rotation, or a combination thereof. In some examples, the second set of predefined criteria includes a threshold speed smaller than that of the first set of predefined criteria, a threshold duration smaller than that of the first set of predefined criteria, a threshold magnitude smaller than that of the first set of predefined criteria, or a combination thereof.

In some examples, at block 738, in accordance with a determination that the one or more characteristics of the rotation meet the second set of predefined criteria, the electronic device provides an output indicative of an ongoing transition from the first mode (e.g., special lock mode) to the second mode (e.g., normal mode). In some examples, at block 740, the output indicative of an ongoing transition from the first mode (e.g., special lock mode) to the second mode (e.g., normal mode) includes a display of an animation of an expanding water droplet (e.g., as illustrated by 622, 636, and 638). In some embodiments, the output indicative of an ongoing transition reduces the number of failed attempts to transition between modes by providing affirmation to the user and prompting the user to sustain the interaction (e.g., rotation of rotational input mechanism). By doing so, the accuracy of the machine-human interface is improved. Moreover, doing so conserves device energy, which in battery-operated devices, is of particular importance.

In some examples, at block 742, in accordance with a determination that the one or more characteristics of the rotation does not meet the second set of predefined criteria, the electronic device (e.g., 600) foregoes providing the output indicative of an ongoing transition from the first mode (e.g., special lock mode) to the second mode (e.g., normal mode).

At block 744, in accordance with a determination that the one or more characteristics of the input (e.g., rotational input 634) detected via the second input mechanism (e.g., rotational input mechanism 608) do not meet the set of predefined criteria (i.e., the first set of predefined criteria), the electronic device (e.g., 600) remains in the first mode (e.g., special lock mode) and foregoes transitioning the electronic device (e.g., 600) into the second mode (e.g., normal mode).

In some examples, at block 746, the electronic device (600), in accordance with the determination that the one or more characteristics of the input detected via the second input mechanism (e.g., rotational input mechanism 608) does not meet the set of predefined criteria, provides an output indicative of a failed transition from the first mode (e.g., special lock mode) to the second mode (e.g., normal mode). In some examples, the output includes the display, via a display (e.g., touch-sensitive display 602) of the electronic device, a reversal of the animation of an expanding water droplet.

At block 748, in accordance with a determination that the one or more characteristics of the input (e.g., rotational input 634) detected via the second input mechanism (e.g., rotational input mechanism 608) meet the set of predefined criteria, the electronic device (e.g., 600) transitions into a second mode (e.g., normal mode). In some examples, the first input mechanism (e.g., touch-sensitive display 602) is enabled for user input in the second mode (e.g., normal mode).

In some examples, at block 750, in accordance with the determination that the one or more characteristics of the input (e.g., rotational input 634) detected via the second input mechanism (e.g., rotational input mechanism 608) meet the set of predefined criteria, the electronic device (e.g., 600) provides an output indicative of a successful transition from the first mode (e.g., special lock mode) to the second mode (e.g., normal mode).

In some examples, at block 752, the output indicative of a successful transition from the first mode to the second mode comprises an animation of a bursting water droplet (e.g., 640) and a textual message (e.g., 642 "UNLOCKED"). In some examples, the electronic device (e.g., 600) displays the animation for a predefined period of time.

In some examples, at block 756, in accordance with the determination that the one or more characteristics of the input (e.g., rotational input 634) detected via the second input mechanism (e.g., rotational input mechanism 608) meet the set of predefined criteria, the electronic device (e.g., 600) emits a sound (e.g., 650) via the speaker. The emitted sound (e.g., 650) is configured to expel liquid from the speaker. By doing so, the electronic device minimizes undesirable interaction between water and the hardware components (e.g., distortion of audio outputs) while the electronic device is operating in the second mode (e.g., normal mode).

In some examples, at block 758, at least a portion of the emitted sound (e.g., 650) has a predefined frequency. In some examples, at block 760, the emitted sound (e.g., 650) has a predefined duration. In some examples, the frequency and the duration of the emitted sound (e.g., 650) are predefined such that the sound is sufficient to eject water from the speaker of the electronic device (e.g., 600).

In some examples, at block 762, the electronic device 600 provides an output indicative of successful transition (e.g., animation 640 and textual message 642) from the first mode (e.g., special lock mode) to the second mode (e.g., normal mode) while emitting the sound (e.g., 650).

In some examples, at block 764, the electronic device (e.g., 600) is in the second mode (e.g., normal mode). At block 766, the electronic device detects, via the first input mechanism (e.g., touch-sensitive display 602), an input (e.g., tap input 605). At block 768, in response to detecting the input via the first input mechanism (e.g., touch-sensitive display 602), the electronic device (e.g., 600) provides an output (e.g., user interface 610) indicating that the input has been detected.

In some examples, at block 770, the electronic device (e.g., 600) is in the second mode (e.g., normal mode). At block 772, the electronic device receives an input (e.g., tap input 619) indicative of a request to enter the first mode (e.g., special lock mode). At block 774, in response to receiving the input (e.g., tap input 619), the electronic device transitions from the second mode (e.g., normal mode) into the first mode (e.g., special lock mode).

In some examples, at block 754, the electronic device (e.g., 600) displays, on the display (e.g., touch-sensitive display 602), a user interface (e.g., educational user interface 620) including a message indicating that the electronic device (e.g., 600) is in the first mode (e.g., special lock mode). In some examples, the user interface includes a graphical component (e.g., water-droplet icon 622) and a textual component (e.g., message 624). In some examples, the textual component (e.g., message 624) includes explanation(s) of the first mode of operation, instruction(s) for transitioning the electronic device back into the second mode (e.g., normal mode), and/or introduction(s) of related features of the electronic device 600. In some examples, the electronic device displays the message only after the electronic device transitions into the first mode (e.g., special lock mode) under particular circumstances (e.g., for the first time since the activation of electronic device 600, for the first time during a user session, for the first time since the pairing the electronic device 600 to a different electronic device). In some embodiments, the display of the message (e.g., 624) informs the user of the state of the electronic device, provides instructions for transitioning modes, and minimizes user attempts to interact with disabled input mechanisms. By doing so, the accuracy of the machine-human interface is improved. Moreover, doing so conserves device energy, which in battery-operated devices, is of particular importance.

In some examples, at block 776, after transitioning from the second mode (e.g., normal mode) into the first mode (e.g., special lock mode), the electronic device (e.g., 600) displays, on the display, a user interface including an indicator (e.g., 626) associated with the first mode (e.g., special lock mode). The display of the indicator (e.g., 626) informs the user of the state of the electronic device and minimizes user attempts to interact with disabled input mechanisms. By doing so, the accuracy of the machine-human interface is improved. Moreover, doing so conserves device energy, which in battery-operated devices, is of particular importance.

In some examples, at block 720, the electronic device (e.g., 600) is in the first mode (e.g., special lock mode). At block 722, while the electronic device is in the first mode, the electronic device detects, via the first input mechanism (e.g., touch-sensitive display 602), an input (e.g., tap input 628). At block 724, after detecting the input via the first input mechanism (e.g., touch-sensitive display 602), the electronic device (e.g., 600) foregoes providing an output indicating that the input has been detected, as illustrated in FIGS. 6J and 6K.

In some examples, at block 726, while the electronic device (e.g., 600) is in the first mode (e.g., special lock mode), the electronic device foregoes detecting an input (e.g., tap input 628) via the first input mechanism (e.g., touch-sensitive display 602) altogether. For example, the hardware (e.g., circuitry) associated with the first input mechanism is not powered.

In some examples, the third input mechanism (e.g., physical button 612) of the electronic device is disabled for user input in the first mode (e.g., special lock mode) and enabled for user input in the second mode (e.g., normal mode). At block 730, the electronic device is in the first mode. At block 732, while the electronic device (e.g., 600) is in the first mode (e.g., special lock mode), the electronic device detects an input (e.g., push input 632) via the third input mechanism (e.g., physical button 612). At block 734, in response to detecting the input via the third input mechanism (e.g., physical button 612), the electronic device displays, on the display (e.g., touch-sensitive display 602), a message (e.g., message 624) indicating that the electronic device (e.g., 600) is in the first mode (e.g., special lock mode). In some embodiments, input detection via the third input mechanism (e.g., physical button 612) is less likely to be triggered by environmental factors (e.g., water) than input detection via the first input mechanism (e.g., touch-sensitive display 602). As such, detection of an input via the third input mechanism can be indicative of a user's attempt to transition out of the first mode. The display of the message (e.g., 624) informs the user of the state of the electronic device and minimizes user attempts to interact with disabled input mechanisms (e.g., the third input mechanism) to transition out of the first mode. By doing so, the accuracy of the machine-human interface is improved. Moreover, doing so conserves device energy, which in battery-operated devices, is of particular importance.

As described below, method 700 provides an intuitive way for managing input mechanisms at an electronic device. The method reduces the cognitive burden on a user for avoiding and/or suppressing detection and/or processing of inadvertent inputs (e.g., caused by water), thereby creating a more efficient human-machine interface. For battery-operated computing devices, enabling a user to manage various input mechanisms faster and more efficiently conserves power and increases the time between battery charges.

Figure 8:
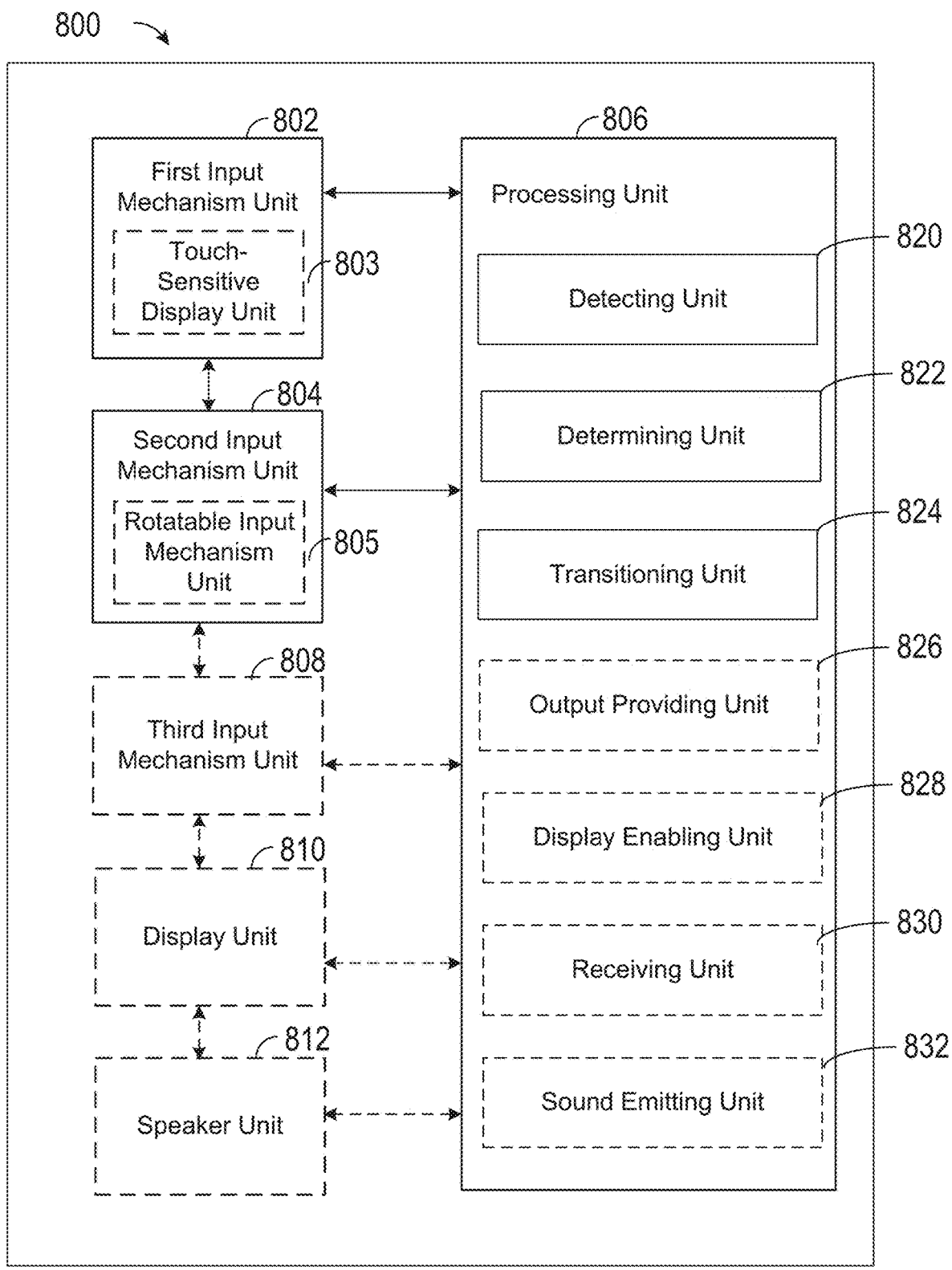
FIG. 8 is a functional block diagram, in accordance with some embodiments.

In accordance with some embodiments, FIG. 8 shows an exemplary functional block diagram of an electronic device 800 configured in accordance with the principles of the various described embodiments. In accordance with some embodiments, the functional blocks of electronic device 800 are configured to perform the techniques described above. The functional blocks of the device 800 are, optionally, implemented by hardware, software, or a combination of hardware and software to carry out the principles of the various described examples. It is understood by persons of skill in the art that the functional blocks described in FIG. 8 are, optionally, combined or separated into sub-blocks to implement the principles of the various described examples. Therefore, the description herein optionally supports any possible combination or separation or further definition of the functional blocks described herein.

As shown in FIG. 8, an electronic device 800 includes a first input mechanism unit 802, a second input mechanism unit 804, and optionally, a third input mechanism unit 808, a display unit 810 configured to display a graphical user interface, and a speaker unit 812 and a processing unit 806 coupled to the first input mechanism unit 802, the second input mechanism unit 804, and optionally, the third input mechanism unit 808, the display unit 810, and the speaker unit 812. Optionally, the first input mechanism unit 802 is a touch-sensitive display unit 803. Optionally, the second input mechanism unit 804 is a rotatable input mechanism unit 805. Optionally, the first input mechanism unit 802 and the display unit 810 are the same unit. In some embodiments, the processing unit 806 includes a detecting unit 820, a determining unit 822, a transitioning unit 824, an output providing unit 826, a display enabling unit 828, a receiving unit 830, and a sound emitting unit 832.

The processing unit 806 is configured to: while the electronic device 800 is in a first mode, wherein the first input mechanism unit 802 is disabled for user input in the first mode, detect (e.g., using detecting unit 820) an input via the second input mechanism unit 804; determine (e.g., using determining unit 822) whether one or more characteristics of the input detected via the second input mechanism unit 804 meet a set of predefined criteria; in accordance with a determination that the one or more characteristics of the input detected via the second input mechanism unit 804 meet the set of predefined criteria, transition (e.g., using transitioning unit 824) the electronic device 800 into a second mode, wherein the first input mechanism unit 802 is enabled for user input in the second mode; in accordance with a determination that the one or more characteristics of the input detected via the second input mechanism unit 804 do not meet the set of predefined criteria, remain in the first mode and forego transitioning the electronic device 800 into the second mode.

In accordance with some embodiments, the first input mechanism unit 802 is associated with a first input modality, and the second input mechanism unit 804 is associated with a second input modality different from the first input modality. In some examples, the second input mechanism unit is associated with an input modality (e.g., rotational inputs detected via mechanical actuation detection) that is not based on capacitive touch detection.

In accordance with some embodiments, the processing unit 806 is further configured to: while the electronic device 800 is in the first mode, detect (e.g., using the detecting unit 802), via the first input mechanism unit 802, an input; after detecting the input via the first input mechanism unit 802, forego providing an output indicating that the input has been detected.

In accordance with some embodiments, the processing unit 806 is further configured to: while the electronic device 800 is in the first mode, forego detecting an input via the first input mechanism unit 802.

In accordance with some embodiments, the processing unit 806 is further configured to: while the electronic device 800 is in the second mode, detect (e.g., using the detecting unit 820), via the first input mechanism unit 802, an input; in response to detecting the input via the first input mechanism unit 802, provide (e.g., using output providing unit 826) an output indicating that the input has been detected.

In accordance with some embodiments, the third input mechanism unit 808 is disabled for user input in the first mode and enabled for user input in the second mode, and the processing unit 806 is further configured to: while the electronic device 800 is in the first mode, detect (e.g., using detecting unit 820) an input via the third input mechanism unit 808; and in response to detecting the input via the third input mechanism unit 808, enable (e.g., using the display enabling unit 828) display of, on the display unit 810, a message indicating that the electronic device 800 is in the first mode.

In accordance with some embodiments, detecting the input via the second input mechanism unit 804 comprises detecting (e.g., using the detecting unit 820) a rotation of the second input mechanism unit 804. In accordance with some embodiments, determining whether one or more characteristics of the input detected via the second input mechanism unit 804 meet the set of predefined criteria comprises: while continuing to detect (e.g., using detecting unit 820) the rotation of the second input mechanism unit 804, determining (e.g., using determining unit 822) whether one or more characteristics of the rotation of the second input mechanism unit 804 meet the set of predefined criteria.

In accordance with some embodiments, the one or more characteristics of the rotation includes a speed of the rotation, a duration of the rotation, a direction of the rotation, a magnitude of the rotation, or a combination thereof.

In accordance with some embodiments, the set of predefined criteria is a first set of predefined criteria. The processing unit 806 is further configured to: while continuing to detect (e.g., using detecting unit 820) the rotation of the second input mechanism unit 804, determine (e.g., using determining unit 822) whether one or more characteristics of the rotation of the second input mechanism unit 804 meet a second set of predefined criteria. The processing unit 806 is further configured to: in accordance with a determination that the one or more characteristics of the rotation meet the second set of predefined criteria, provide (e.g., using output providing unit 826) an output indicative of an ongoing transition from the first mode to the second mode; and in accordance with a determination that the one or more characteristics of the rotation does not meet the second set of predefined criteria, forego providing the output indicative of an ongoing transition from the first mode to the second mode.

In accordance with some embodiments, providing the output indicative of an ongoing transition from the first mode to the second mode includes enabling (e.g., using display enabling unit 828) display of, on the display unit 810, an animation of an expanding water droplet.

In accordance with some embodiments, the processing unit 806 is further configured to: in accordance with the determination that the one or more characteristics of the input detected via the second input mechanism unit 804 meet the set of predefined criteria, provide (e.g., using output providing unit 826) an output indicative of a successful transition from the first mode to the second mode; and in accordance with the determination that the one or more characteristics of the input detected via the second input mechanism unit 804 does not meet the set of predefined criteria, provide (e.g., using output providing unit 826) an output indicative of a failed transition from the first mode to the second mode.

In accordance with some embodiments, the output indicative of a successful transition from the first mode to the second mode comprises an animation of one or more bursting water droplets.

In accordance with some embodiments, the processing unit 806 is further configured to: while the electronic device 800 is in the second mode, receive (e.g., using receiving unit 830) an input indicative of a request to enter the first mode; and in response to receiving the input, transition (e.g., using transitioning unit 824) the electronic device 800 from the second mode into the first mode.

In accordance with some embodiments, the processing unit 806 is further configured to: after transitioning the electronic device 800 from the second mode into the first mode, enable (e.g., using display enabling unit 828) display of a user interface, wherein the user interface includes an indicator associated with the first mode.

In accordance with some embodiments, transitioning the electronic device 800 into the first mode comprises: enabling (e.g., using display enabling unit 828) display of a message indicating that the electronic device 800 is in the first mode.

In accordance with some embodiments, the processing unit 806 is further configured to: in accordance with the determination that the one or more characteristics of the input detected via the second input mechanism unit 804 meet the set of predefined criteria, emit (e.g., using sound emitting unit 832) a sound via the speaker unit 812. The emitted sound is configured to expel liquid from the speaker unit 812.

In accordance with some embodiments, at least a portion of the sound has a predefined frequency.

In accordance with some embodiments, the sound has a predefined duration.

In accordance with some embodiments, the processing unit 806 is further configured to: provide (e.g., using output providing unit 826) an output indicative of successful transition from the first mode to the second mode while emitting the sound.

The operations described above with reference to FIGS. 7A-7E are, optionally, implemented by components depicted in FIGS. 1A-1B or FIG. 8. For example, detecting operation 704, determining operation 714, and transitioning operation 748 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device, comprising:
   a first input mechanism;
   a second input mechanism;
   one or more processors; and
   a memory storing one or more programs configured to be executed by the one or more processors, the one or more programs including instructions for:
      while the electronic device is in a first mode, wherein user input selecting one or more displayed affordances using the first input mechanism is restricted in the first mode, wherein the first input mechanism comprises a touch-sensitive display, detecting an input via the second input mechanism;
      determining whether one or more characteristics of the input detected via the second input mechanism meet a set of predefined criteria;
      in accordance with a determination that the one or more characteristics of the input detected via the second input mechanism meet the set of predefined criteria, wherein the one or more characteristics of the input detected via the second input mechanisms includes a duration requirement, transitioning the electronic device into a second mode, wherein user input selecting one or more displayed affordances using the first input mechanism is enabled in the second mode; and
      in accordance with a determination that the one or more characteristics of the input detected via the second input mechanism do not meet the set of predefined criteria, remaining in the first mode and foregoing transitioning the electronic device into the second mode.

2. The electronic device of claim 1, wherein the second input mechanism is a rotatable input mechanism.

3. The electronic device of claim 1, wherein the one or more programs further include instructions for:
   while the electronic device is in the first mode,
      detecting, via the first input mechanism, an input; and
      after detecting the input via the first input mechanism, foregoing providing an output indicating that the input has been detected.

4. The electronic device of claim 1, wherein the one or more programs further include instructions for:
   while the electronic device is in the first mode,
      foregoing detecting an input via the first input mechanism.

5. The electronic device of claim 1, wherein the one or more programs further include instructions for:
   while the electronic device is in the second mode,
      detecting, via the first input mechanism, an input; and
      in response to detecting the input via the first input mechanism, providing an output indicating that the input has been detected.

6. The electronic device of claim 1, wherein the electronic device further comprises a display and a third input mechanism, wherein the third input mechanism is disabled for user input in the first mode and enabled for user input in the second mode, and wherein the one or more programs further include instructions for:
   while the electronic device is in the first mode,
      detecting an input via the third input mechanism; and
      in response to detecting the input via the third input mechanism, displaying, on the display, a message indicating that the electronic device is in the first mode.

7. The electronic device of claim 1,
   wherein detecting the input via the second input mechanism comprises detecting a rotation of the second input mechanism, and
   wherein determining whether one or more characteristics of the input detected via the second input mechanism meet the set of predefined criteria comprises:
      while continuing to detect the rotation of the second input mechanism, determining whether one or more characteristics of the rotation of the second input mechanism meet the set of predefined criteria.

8. The electronic device of claim 7, wherein the set of predefined criteria is a first set of predefined criteria, and wherein the one or more programs further include instructions for:
   while continuing to detect the rotation of the second input mechanism, determining whether one or more characteristics of the rotation of the second input mechanism meet a second set of predefined criteria;

in accordance with a determination that the one or more characteristics of the rotation meet the second set of predefined criteria, providing an output indicative of an ongoing transition from the first mode to the second mode; and in accordance with a determination that the one or more characteristics of the rotation does not meet the second set of predefined criteria, foregoing providing the output indicative of an ongoing transition from the first mode to the second mode.

9. The electronic device of claim 8, wherein the electronic device further includes a display and wherein providing the output indicative of an ongoing transition from the first mode to the second mode includes displaying, on the display, an animation of an expanding water droplet.

10. The electronic device of claim 1, wherein the one or more programs further include instructions for:

in accordance with the determination that the one or more characteristics of the input detected via the second input mechanism meet the set of predefined criteria, providing an output indicative of a successful transition from the first mode to the second mode; and in accordance with the determination that the one or more characteristics of the input detected via the second input mechanism does not meet the set of predefined criteria, providing an output indicative of a failed transition from the first mode to the second mode.

11. The electronic device of claim 10, wherein the output indicative of a successful transition from the first mode to the second mode comprises an animation of one or more bursting water droplets.

12. The electronic device of claim 1, wherein the one or more programs further include instructions for:

while the electronic device is in the second mode,
receiving an input indicative of a request to enter the first mode; and
in response to receiving the input, transitioning the electronic device from the second mode into the first mode.

13. The electronic device of claim 12, wherein the electronic device includes a display, and wherein the one or more programs further include instructions for: after transitioning the electronic device from the second mode into the first mode, displaying, on the display, a user interface including an indicator associated with the first mode.

14. The electronic device of claim 12, wherein the electronic device includes a display, and wherein transitioning the electronic device into the first mode comprises: displaying, on the display, a message indicating that the electronic device is in the first mode.

15. The electronic device of claim 1, wherein the electronic device includes a speaker, and wherein the one or more programs further include instructions for:

in accordance with the determination that the one or more characteristics of the input detected via the second input mechanism meet the set of predefined criteria, emitting a sound via the speaker, wherein the emitted sound is configured to expel liquid from the speaker; and in accordance with the determination that the one or more characteristics of the input detected via the second input mechanism do not meet the set of predefined criteria, foregoing emitting a sound via the speaker.

16. The electronic device of claim 15, wherein at least a portion of the sound has a predefined frequency.

17. The electronic device of claim 16, wherein the one or more programs further include instructions for: providing an output indicative of successful transition from the first mode to the second mode while emitting the sound.

18. A non-transitory computer-readable storage medium storing one or more programs configured to be executed by one or more processors of an electronic device, a first input mechanism and a second input mechanism, the one or more programs including instructions for:

while the electronic device is in a first mode, wherein user input selecting one or more displayed affordances using the first input mechanism is restricted in the first mode, wherein the first input mechanism comprises a touch-sensitive display, detecting an input via the second input mechanism;

determining whether one or more characteristics of the input detected via the second input mechanism meet a set of predefined criteria;

in accordance with a determination that the one or more characteristics of the input detected via the second input mechanism meet the set of predefined criteria, wherein the one or more characteristics of the input detected via the second input mechanisms includes a duration requirement, transitioning the electronic device into a second mode, wherein user input selecting one or more displayed affordances using the first input mechanism is enabled in the second mode; and in accordance with a determination that the one or more characteristics of the input detected via the second input mechanism do not meet the set of predefined criteria, remaining in the first mode and foregoing transitioning the electronic device into the second mode.

19. The non-transitory computer-readable storage medium of claim 18, wherein the second input mechanism is a rotatable input mechanism.

20. The non-transitory computer-readable storage medium of claim 18, wherein the one or more programs further include instructions for:

while the electronic device is in the first mode,
detecting, via the first input mechanism, an input; and
after detecting the input via the first input mechanism, foregoing providing an output indicating that the input has been detected.

21. The non-transitory computer-readable storage medium of claim 18, wherein the one or more programs further include instructions for:

while the electronic device is in the first mode,
foregoing detecting an input via the first input mechanism.

22. The non-transitory computer-readable storage medium of claim 18, wherein the one or more programs further include instructions for:

while the electronic device is in the second mode,
detecting, via the first input mechanism, an input; and
in response to detecting the input via the first input mechanism, providing an output indicating that the input has been detected.

23. The non-transitory computer-readable storage medium of claim 18, wherein the electronic device further comprises a display and a third input mechanism, wherein the third input mechanism is disabled for user input in the first mode and enabled for user input in the second mode, and wherein the one or more programs further include instructions for:

while the electronic device is in the first mode,
  detecting an input via the third input mechanism; and
  in response to detecting the input via the third input mechanism, displaying, on the display, a message indicating that the electronic device is in the first mode.

24. The non-transitory computer-readable storage medium of claim 18,
  wherein detecting the input via the second input mechanism comprises detecting a rotation of the second input mechanism, and
  wherein determining whether one or more characteristics of the input detected via the second input mechanism meet the set of predefined criteria comprises:
    while continuing to detect the rotation of the second input mechanism, determining whether one or more characteristics of the rotation of the second input mechanism meet the set of predefined criteria.

25. The non-transitory computer-readable storage medium of claim 24, wherein the set of predefined criteria is a first set of predefined criteria, and wherein the one or more programs further include instructions for:
  while continuing to detect the rotation of the second input mechanism, determining whether one or more characteristics of the rotation of the second input mechanism meet a second set of predefined criteria;
  in accordance with a determination that the one or more characteristics of the rotation meet the second set of predefined criteria, providing an output indicative of an ongoing transition from the first mode to the second mode; and
  in accordance with a determination that the one or more characteristics of the rotation does not meet the second set of predefined criteria, foregoing providing the output indicative of an ongoing transition from the first mode to the second mode.

26. The non-transitory computer-readable storage medium of claim 25, wherein the electronic device further includes a display and wherein providing the output indicative of an ongoing transition from the first mode to the second mode includes displaying, on the display, an animation of an expanding water droplet.

27. The non-transitory computer-readable storage medium of claim 18, wherein the one or more programs further include instructions for:
  in accordance with the determination that the one or more characteristics of the input detected via the second input mechanism meet the set of predefined criteria, providing an output indicative of a successful transition from the first mode to the second mode; and
  in accordance with the determination that the one or more characteristics of the input detected via the second input mechanism does not meet the set of predefined criteria, providing an output indicative of a failed transition from the first mode to the second mode.

28. The non-transitory computer-readable storage medium of claim 27, wherein the output indicative of a successful transition from the first mode to the second mode comprises an animation of one or more bursting water droplets.

29. The non-transitory computer-readable storage medium of claim 18, wherein the one or more programs further include instructions for:
  while the electronic device is in the second mode, receiving an input indicative of a request to enter the first mode; and
  in response to receiving the input, transitioning the electronic device from the second mode into the first mode.

30. The non-transitory computer-readable storage medium of claim 29, wherein the electronic device includes a display, and wherein the one or more programs further include instructions for: after transitioning the electronic device from the second mode into the first mode, displaying, on the display, a user interface including an indicator associated with the first mode.

31. The non-transitory computer-readable storage medium of claim 29, wherein the electronic device includes a display, and wherein transitioning the electronic device into the first mode comprises: displaying, on the display, a message indicating that the electronic device is in the first mode.

32. The non-transitory computer-readable storage medium of claim 18, wherein the electronic device includes a speaker, and wherein the one or more programs further include instructions for:
  in accordance with the determination that the one or more characteristics of the input detected via the second input mechanism meet the set of predefined criteria, emitting a sound via the speaker, wherein the emitted sound is configured to expel liquid from the speaker; and
  in accordance with the determination that the one or more characteristics of the input detected via the second input mechanism do not meet the set of predefined criteria, foregoing emitting a sound via the speaker.

33. The non-transitory computer-readable storage medium of claim 32, wherein at least a portion of the sound has a predefined frequency.

34. The non-transitory computer-readable storage medium of claim 33, wherein the one or more programs further include instructions for: providing an output indicative of successful transition from the first mode to the second mode while emitting the sound.

35. A method, comprising:
  at an electronic device with a first input mechanism and a second input mechanism:
    while the electronic device is in a first mode, wherein user input selecting one or more displayed affordances using the first input mechanism is restricted in the first mode, wherein the first input mechanism comprises a touch-sensitive display, detecting an input via the second input mechanism;
    determining whether one or more characteristics of the input detected via the second input mechanism meet a set of predefined criteria;
    in accordance with a determination that the one or more characteristics of the input detected via the second input mechanism meet the set of predefined criteria, wherein the one or more characteristics of the input detected via the second input mechanisms includes a duration requirement, transitioning the electronic device into a second mode, wherein user input selecting one or more displayed affordances using the first input mechanism is enabled in the second mode; and
    in accordance with a determination that the one or more characteristics of the input detected via the second input mechanism do not meet the set of predefined criteria, remaining in the first mode and foregoing transitioning the electronic device into the second mode.

36. The method of claim 35, wherein the second input mechanism is a rotatable input mechanism.

37. The method of claim 35, the method further comprising:
while the electronic device is in the first mode, detecting, via the first input mechanism, an input; and
after detecting the input via the first input mechanism, foregoing providing an output indicating that the input has been detected.

38. The method of claim 35, the method further comprising:
while the electronic device is in the first mode,
foregoing detecting an input via the first input mechanism.

39. The method of claim 35, the method further comprising:
while the electronic device is in the second mode,
detecting, via the first input mechanism, an input; and
in response to detecting the input via the first input mechanism, providing an output indicating that the input has been detected.

40. The method of claim 35, wherein the electronic device further comprises a display and a third input mechanism, wherein the third input mechanism is disabled for user input in the first mode and enabled for user input in the second mode, the method further comprising:
while the electronic device is in the first mode,
detecting an input via the third input mechanism; and
in response to detecting the input via the third input mechanism, displaying, on the display, a message indicating that the electronic device is in the first mode.

41. The method of claim 35,
wherein detecting the input via the second input mechanism comprises detecting a rotation of the second input mechanism, and
wherein determining whether one or more characteristics of the input detected via the second input mechanism meet the set of predefined criteria comprises:
while continuing to detect the rotation of the second input mechanism, determining whether one or more characteristics of the rotation of the second input mechanism meet the set of predefined criteria.

42. The method of claim 41, wherein the set of predefined criteria is a first set of predefined criteria, the method further comprising:
while continuing to detect the rotation of the second input mechanism, determining whether one or more characteristics of the rotation of the second input mechanism meet a second set of predefined criteria;
in accordance with a determination that the one or more characteristics of the rotation meet the second set of predefined criteria, providing an output indicative of an ongoing transition from the first mode to the second mode; and
in accordance with a determination that the one or more characteristics of the rotation does not meet the second set of predefined criteria, foregoing providing the output indicative of an ongoing transition from the first mode to the second mode.

43. The method of claim 42, wherein the electronic device further includes a display and wherein providing the output indicative of an ongoing transition from the first mode to the second mode includes displaying, on the display, an animation of an expanding water droplet.

44. The method of claim 35, the method further comprising:
in accordance with the determination that the one or more characteristics of the input detected via the second input mechanism meet the set of predefined criteria, providing an output indicative of a successful transition from the first mode to the second mode; and
in accordance with the determination that the one or more characteristics of the input detected via the second input mechanism does not meet the set of predefined criteria, providing an output indicative of a failed transition from the first mode to the second mode.

45. The method of claim 44, wherein the output indicative of a successful transition from the first mode to the second mode comprises an animation of one or more bursting water droplets.

46. The method of claim 35, the method further comprising:
while the electronic device is in the second mode,
receiving an input indicative of a request to enter the first mode; and
in response to receiving the input, transitioning the electronic device from the second mode into the first mode.

47. The method of claim 46, wherein the electronic device includes a display, the method further comprising: after transitioning the electronic device from the second mode into the first mode, displaying, on the display, a user interface including an indicator associated with the first mode.

48. The method of claim 46, wherein the electronic device includes a display, and wherein transitioning the electronic device into the first mode comprises: displaying, on the display, a message indicating that the electronic device is in the first mode.

49. The method of claim 35, wherein the electronic device includes a speaker, the method further comprising:
in accordance with the determination that the one or more characteristics of the input detected via the second input mechanism meet the set of predefined criteria, emitting a sound via the speaker, wherein the emitted sound is configured to expel liquid from the speaker; and
in accordance with the determination that the one or more characteristics of the input detected via the second input mechanism do not meet the set of predefined criteria, foregoing emitting a sound via the speaker.

50. The method of claim 49, wherein at least a portion of the sound has a predefined frequency.

51. The method of claim 50, the method further comprising: providing an output indicative of successful transition from the first mode to the second mode while emitting the sound.

* * * * *